(12) United States Patent
Lorah et al.

(10) Patent No.: US 7,211,613 B2
(45) Date of Patent: May 1, 2007

(54) HYDROPHOBICALLY MODIFIED CLAY POLYMER NANOCOMPOSITES

(75) Inventors: Dennis Paul Lorah, Lansdale, PA (US); Robert Victor Slone, Quakertown, PA (US); Thomas Glenn Madle, Flourtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 370 days.

(21) Appl. No.: 09/953,710

(22) Filed: Sep. 17, 2001

(65) Prior Publication Data

US 2002/0058739 A1 May 16, 2002

Related U.S. Application Data

(60) Provisional application No. 60/234,263, filed on Sep. 21, 2000, provisional application No. 60/257,041, filed on Dec. 21, 2000, and provisional application No. 60/300,946, filed on Jun. 26, 2001.

(51) Int. Cl.
*C08K 3/34* (2006.01)
*C08F 12/08* (2006.01)

(52) U.S. Cl. .............. 524/445; 524/186; 524/446; 526/128; 526/126; 526/348

(58) Field of Classification Search ............ 524/186, 524/445, 789; 526/128, 126, 348; 501/141, 501/145
See application file for complete search history.

(56) References Cited

U.S. PATENT DOCUMENTS

| | | | |
|---|---|---|---|
| 2,531,356 A | 11/1950 | Carter et al. | |
| 2,883,356 A | 4/1959 | Gluesenkamp | |
| 4,739,007 A | 4/1988 | Okada et al. | |
| 4,889,885 A | 12/1989 | Usuki et al. | |
| 5,718,841 A * | 2/1998 | Mardis et al. | 516/34 |
| 5,767,213 A * | 6/1998 | Graham et al. | 526/230 |
| 5,780,376 A | 7/1998 | Gonzales et al. | |
| 5,837,763 A | 11/1998 | Ferraro et al. | |
| 5,883,173 A | 3/1999 | Elspass et al. | |
| 5,936,023 A | 8/1999 | Kato et al. | |
| 5,962,553 A | 10/1999 | Ellsworth | |
| 5,973,053 A | 10/1999 | Usuki et al. | |
| 6,034,164 A | 3/2000 | Elspass et al. | |
| 6,057,035 A | 5/2000 | Singh et al. | |
| 6,252,020 B1 * | 6/2001 | Kuo et al. | 526/128 |

FOREIGN PATENT DOCUMENTS

EP     0846662 A2     6/1998

OTHER PUBLICATIONS

Xinyu, H.; Grittain W. J.; Synthesis and Characterization of PMMA Nanocomposites by Suspension and Emulsion Polymerization, ACS Polbilcatioin, Sep. 26, 2000.*

Huang et al., "Sythesis Of A PMMA–Layered Silicate Nanocomposites by Suspension Polymerization", Amer. Chem. S. (2000).

Xavier Kommann, "Synthesis and Characterization of Thermoset–Clay Nanocomposites", Div. Of Polymer Engr., Lulea Tekniska University of Technology.

M. Ogawa et al., "Preparation of inorganic–organic nanocomposites through intercalation of organoammonium ions into layered silicates", Bull. Chem. Soc. Jpn., 70, 2593–2619 (1997).

Okamoto M. et al., "Synthesis and structure of smectic clay/poly (methyl methacrylate) and clay/polystyrene nanocomposites via in situ intercaalative polymerization", Polymer, Elsevier Science Publishers B.V. GB, vol. 41, NR. 10, pp. 3887–3890, XP004189005, ISN:0032–3861.

Hanley H J M et al., "Clay platelet dispersion in a polymer matrix", Materials Letters, North Holland Publishing Company, Amsterdam, NL vol. 28, Nr. 4, pp. 379–384, XP004031141, ISSN: 0167–577X, ISSN: 0167–577X.

1913 Lecture Notes for Clay Mineralogy, www.gly.uga.edu/schroeder/geo16550/CM20.html.

JiaQi Fan et al, "SEM Study of a Polystyrene/Clay Nanocomposite", State Key Laboratory of Engr. Plastics, Center for Molecular Science, Chinese Academy of Sciences, Beijing 10080, People's Republic of China, Journal of Applied Polymer Sciences, vol. 83, pp. 66–69.

C.D. Muzny et al; "Clay platelet dispersion in a polymer matrix"; Elsevier Science B.V., Materials Letters 28, pp. 379–384, (1996).

* cited by examiner

*Primary Examiner*—Tae H. Yoon
(74) *Attorney, Agent, or Firm*—Andrew E. C. Merriam

(57) ABSTRACT

The present invention is directed, in part, to improved nanocomposite compositions and processes for preparing same. Specifically, in one embodiment, there is provided a process for preparing an aqueous nanocomposite dispersion, wherein the process comprises: polymerizing via suspension polymerization a suspension comprising at least one ethylenically unsaturated monomer and a hydrophobically modified clay to form the nanocomposite dispersion after polymerization, wherein the hydrophobically modified clay is dispersed in the monomer. Other embodiments include processes for preparing aqueous nanocomposite particles, colloids, and dispersions using hydrophobically modified clays in aqueous systems and compositions comprising same.

12 Claims, No Drawings

HYDROPHOBICALLY MODIFIED CLAY POLYMER NANOCOMPOSITES

CROSS REFERENCE TO RELATED PATENT APPLICATIONS

This is a non-provisional application of prior now abandoned U.S. provisional applications serial No. 60/234,263 filed Sep. 21, 2000; No. 60/257,041 filed Dec. 21, 2000; and No. 60/300,946 filed on Jun. 26, 2001.

The present invention relates generally to improved nanocomposite compositions and methods for making and using the same. More particularly, the present invention relates to methods of making nanocomposites using hydrophobically modified clays in aqueous systems. This invention also relates to the use of these nanocomposite compositions as, for example, coatings, sealants, thermosets, textiles, textile binders, caulks, adhesives, and as plastics additives.

One way of improving polymer properties is by adding a clay material to polymers to form composite materials. However, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and the polymers is related to the fact that clays, by nature, are generally hydrophilic whereas polymers, such as the polymers used in the aforementioned applications, are generally hydrophobic.

Clay minerals are typically comprised of hydrated aluminum silicates that are fine-grained and have a platy habit. The crystalline structure of a typical clay mineral is a multi-layered structure comprised of combinations of layers of $SiO_4$ tetrahedra that are joined to layers of $AlO(OH)_2$ octahedra. The term Agallery@, as used herein, describes the interlayer spaces of the layered clay minerals. The terms "d-spacing" or "basal spacing", as used herein, define the sum of the single layer thickness and the thickness of the interlayer or gallery, which is the repeat unit of the multilayer mineral. Depending upon the clay mineral, the gallery may contain water and/or other constituents such as potassium, sodium, or calcium cations. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

Nanocomposites are compositions in which at least one of its constituents has one or more dimensions, such as length, width or thickness, in the nanometer size range. The term "nanocomposite", as used herein, denotes the state of matter wherein polymer molecules exist among exfoliated clay layers. Recently, nanocomposites that contain layered clay materials such as montmorillonite having silicate layers of a thickness of 1 nanometer dispersed within a polymeric matrix, have been developed as a means to improve the physical properties of polymers. In order to effectively improve the physical or mechanical properties, the clay is typically uniformly dispersed throughout the polymer in order to promote more interfaces between the clay and polymer and enhance the affinity of the clay to the polymer at these interfaces. Further, if the clay is uniformly dispersed throughout the polymer, less clay material may be added to the nanocomposite composition while maintaining the physical properties of the nanocomposite.

Polymer-clay nanocomposites can be characterized as being one of several general types: intercalated nanocomposite, exfoliated composite, or combinations thereof. The term "intercalated nanocomposite", as used herein, describes a nanocomposite that consists of a regular insertion of the polymer in between the clay layers. The term "exfoliated nanocomposite", as used herein, describes a nanocomposite wherein the 1 nm-thick layers of clay are dispersed in the matrix forming a composite structure on the microscale. The latter type of composite, or exfoliated nanocomposite, maximizes the polymer-clay interactions thereby making the entire surface of the clay layers available for the polymer. This modification may lead to the most dramatic changes in mechanical and physical properties of the resultant polymer. By contrast, the term "conventional composite", as used herein, describes a composite where the clay acts as a conventional filler and is not dispersed on a nano-scale. These composites generally do not enjoy the improvement in mechanical and physical properties seen with exfoliated nanocomposites. In certain embodiments of the present invention, some portion of the clay in the polymer clay nanocomposites may exist as structures larger than exfoliated or intercalated composites.

In order to promote more affinity between the clay and the polymer at the interface and provide a uniform dispersion of the clay within the polymer, the interlayer surface chemistry of the clay may be modified to render the silicate layers less hydrophilic. Previous methods of altering the interlayer surface chemistry of the clay include the use of agents, such as surfactants or silanes, to prepare a clay dispersion prior to its incorporation into a polymer. For example, surfactants may typically comprise a molecule having a hydrophilic functions (which has an affinity to polar media such as water or clay) and an organophilic function (which has an affinity to organic molecules such as oil or polymer). The use of surfactants allows one to disperse clay within a polymer. As used herein, the term "hydrophobically modified clays" denotes clays that may have its surface chemistry modified through the use of an agent such as a surfactant, silane, or other modifier.

Typical agents used to render a clay less hydrophilic may include, but are not limited to, amino acids, alkylammonium ions, silanes, aminomethylstyrene, or living free radical polymerization initiator ("LFRP"). Further non-limiting examples of other suitable agents for the synthesis of nanocomposites are provided in the reference, M. Ogawa et al., "Preparation of inorganic-organic nanocomposites through intercalation of organoammonium ions into layered silicates", Bull. Chem. Soc. Jpn., 70, 2593–2619 (1997).

Amino acid surfactants are molecules that may consist of a basic amino group ($-NH_2$) and an acidic carboxyl group ($-COOH$). When introduced into an acidic medium, a proton may be transferred from the —COOH group to the intramolecular —NH$_2$ group. It is believed that a cation exchange occurs between the —NH$_3^+$ functional group that is formed and the naturally occurring cations (i.e., Na$^+$, K$^+$, etc.) present between the clay layers. This results in an intercalated state wherein the —NH$_3^+$ functional groups are "sandwiched" between the individual layers replacing the naturally occurring cation. The term "intercalate," as used herein, refers to incorporating foreign molecules, atoms, or ions in between the layers of the clay material. As a result of this intercalated state, the clay become organophillic. Amino acid surfactants are commonly used in the preparation of polyamide 6-clay hybrids because their acid functional group may polymerize with ε-caprolactam that is intercalated between the layers. As a result, the intragallery polymerization delaminates the clay in the polymer matrix thereby forming a nanocomposite.

Alkylammonium ion surfactants, such as onium salts, are commonly used to prepare clay dispersions for nanocomposite materials. The basic formula for a typical alkylammonium ion is $CH_3—(CH_2)_n—NH_3^+$ where n is between 1 and 18. It is believed that the alkylammonium ions also readily exchange with the naturally occurring cations present between the clay platelets resulting in an intercalated state. Further, it is believed that the alkylammonium ions may increase the d-spacing between the clay layers and also may lower the surface energy of the clay thereby allowing organic species with different polarities to become intercalated between the clay layers.

Silanes may also be used in the synthesis of unsaturated polyester-clay nanocomposites. Silanes are a family of organosilicon monomers, which may be characterized by the formula R—SiX$_3$, where R is an organofunctional group, attached to silicon in a hydrolytically stable manner and X designates hydrolyzable groups that may be converted to silanol groups upon hydrolysis. It is believed that silanes interact with inorganic surfaces such as clay that have hydroxyl groups attached primarily to silicon or aluminum thereby forming a bond with the inorganic surface.

Hydrophobically modified clays have been oftentimes used in the preparation of nanocomposite materials. The article, "Synthesis and Characterization of Thermoset-Clay Nanocomposites" by Xavier Kornmann (referred to herein as the "Kornmann") provides some examples for synthesizing nanocomposites using hydrophobically modified clays using in-situ polymerization, melt intercalation, or solution-based polymerization methods. In the in-situ polymerization method, the hydrophobically modified clay, referred to in the article as "organoclay", is swollen in a monomer and then the polymerization reaction is initiated, through the addition of a curing agent or by an increase in temperature, to form the nanocomposite. It is believed that the polymerization reaction leads to the delamination of the clay. In the melt intercalation method, a molten thermoplastic is blended with a hydrophobically modified clay and then annealed at a temperature above the glass transition temperature of the polymer to form the nanocomposite. Lastly, in the solution polymerization method, the hydrophobically modified clay is first swollen in a solvent such as toluene or N,N-dimethylformamide. The polymer is then dissolved into the solvent where it intercalates between the clay layers. The solvent is then removed from the resulting nanocomposite via evaporation.

None of the methods disclosed in Kormann uses hydrophobically modified clays within aqueous systems. However, Kormann discusses preparing nanocomposites using solution polymerization involving untreated clays, or unmodified clays, in which the polar solvent is deionized water. There are significant processing difficulties encountered when preparing nanocomposites in aqueous dispersions using hydrophobically modified clays. In this connection, U.S. Pat. No. 5,883,173 issued to Elspass et al. (hereafter "Elspass") describes a process for preparing single stage rubbery nanocomposite materials by polymerizing or blending latex polymers in the presence of a dispersion of a layered (clay) material. In the aqueous latex processes provided, Elspass discloses that the layered material is dispersed in water with a surfactant such as an onium salt for separating the layers, and then the monomers are polymerized for approximately 46 hours to allow the polymers to intercalate between the layers.

The step of adding a surfactant to exfoliate the layers is time-consuming (e.g., Elspass discloses mixing a clay, surfactant, and monomer slurry for 20 hours, prior to polymerizing for another 26 hours). Moreover, the exfoliated clay dispersions tend to be highly viscous thereby causing processing problems. The processes of the present invention are much faster and lower in viscosity than those disclosed by Elspass.

The reference, Huang et al. "Synthesis and Characterization of PMMA Nanocomposites by Suspension and Emulsion Polymerization", Amer. Chem. S. (2000) ("Huang") describes the use of hydrophobically modified clays to form a nanocomposite via suspension polymerization or emulsion polymerization. During the suspension polymerization, the hydrophobically modified clays are used as "suspension stabilizers" whereas during the emulsion polymerization, the surfactant was used as the emulsifier and the unmodified clay was added after polymerization. The Tg of the resultant nanocomposites are too high to be useful for many of the applications disclosed herein. Further, the nanocomposites are formed by a "melt press" process rather than in an aqueous system.

Another disadvantage of using hydrophobically modified clays is that the surfactants used to modify the clay may destabilize polymer latex emulsions. Many of the surfactants, such as onium salts, that are used to disperse clays are also emulsifying agents. In some cases, extreme difficulties may be encountered in the preparation of a stable polymer latex in the presence of such onium salt modified clays. To keep such emulsions stable in the presence of such onium salts, a large quantity of emulsifier is typically required. However, large quantities of emulsifier may deleteriously affect the formation of polymer latex particles. Furthermore, non-uniform polymer latex particle formation may lead to variations in emulsion droplet size resulting in non-uniform polymer particle sizes. Large quantities of emulsifier may also lead to the formation of "secondary particles" which may further broaden the particle size distribution. As well, there are often problems associated with broad particle size distributions such as shear instability of the emulsion, variability in polymer molecular weight (leading to variations in polymer process and properties), and degradation of properties when dried to a powder (e.g., dust resulting from the presence of small polymer particles).

SUMMARY OF THE PRESENT INVENTION

It is thus surprising and unexpected to prepare polymer clay nanocomposites incorporating hydrophobically modified clays in aqueous based systems. The methods of the present invention provide polymer clay nanocomposites that exhibit control of particle size, stability, and high polymerization rates. The methods of the present invention allow for control of reaction conditions such as temperature that is advantageous for industrial or commercial production. The methods of the present invention also allow for control of the viscosity of the resultant aqueous nanocomposite dispersions and thereby avoid processing problems associated with high viscosity.

Nanocomposites produced in accordance with the methods of the present invention may preferably be provided in a form suitable for direct use in a variety of compositions, such as, for example, coatings, sealants, thermosets, textiles, textile binders, caulks, adhesives, and as plastics additives. The polymer clay nanocomposites of the present invention show significant property improvements at clay levels of 2–5%, such as increased tensile strength with little or no adverse effect on ancillary properties such as barrier properties, flexibility and the like. By contrast, conventional composites typically need 15–30% of a filler in order to see significant reinforcement. At this level of filler, ancillary properties like barrier properties, flexibility and the like are degraded.

The present invention is directed, in part, to nanocomposite compositions in aqueous systems and processes for preparing same. Specifically, in one embodiment, there is provided a process for preparing a nanocomposite dispersion, wherein the process comprises: polymerizing via suspension polymerization a suspension comprising at least one ethylenically unsaturated monomer and a hydrophobically modified clay to form the nanocomposite dispersion after polymerization, wherein the hydrophobically modified clay is dispersed in the monomer. In certain embodiments of the present invention, the suspension polymerization process comprises: providing at least one stabilizer wherein the stabilizer is dispersable or soluble within a liquid medium; providing a clay dispersion comprising a hydrophobically modified clay and at least one ethylenically unsaturated monomer; adding the clay dispersion to the at least one stabilizer; and polymerizing the monomer to form the nanocomposite dispersion.

A further aspect of the present invention is directed to a method for preparing a plurality of hollow, polymer clay nanocomposite compositions and compositions incorporating same. In one embodiment, there is provided a process for preparing hollow, polymer clay particles comprising the steps of providing a polymer seed dispersion comprising polymer seeds and a hydrophobically modified clay; combining the polymer seed dispersion with at least one poly-unsaturated monomer and, optionally, at least one ethylenically unsaturated monomer and to provide a reaction mixture; and polymerizing the monomer within the reaction mixture to form the hollow polymer clay nanocomposite particles. In certain embodiments of the present invention, the providing step further comprises swelling the polymer seeds within a solvent and evaporating the solvent within the polymer seeds wherein the polymer seeds have a number average diameter of 10 μm or below.

Another aspect of the present inventions is directed to a method for preparing a polymer clay nanocomposite colloid and compositions incorporating same. In one embodiment, there is provided a process for preparing a polymer clay nanocomposite colloid comprising polymerizing via mini-emulsion polymerization a suspension that has at least one ethylenically unsaturated monomer and a hydrophobically modified clay to form the nanocomposite colloid after polymerization, wherein the hydrophobically modified clay is dispersed in the monomer. In certain embodiments of the present invention, the mini-emulsion polymerization comprises the steps of providing an aqueous mixture comprising at least one surfactant; providing a hydrophobically modified clay and at least one ethylenically unsaturated monomer, optionally at least one surfactant, and optionally, at least one co-surfactant to provide a clay dispersion; adding the clay dispersion to the aqueous mixture under agitation conditions to provide a monomer clay aqueous dispersion; processing the monomer clay aqueous dispersion to provide a plurality of mini-emulsion droplets comprising the monomer and the clay; and polymerizing the monomer within the mini-emulsion droplets to form the polymer clay nanocomposite colloid.

Yet another aspect of the present invention is directed to a method for preparing a polymer clay nanocomposite dispersion and compositions incorporating same. In one embodiment, there is provided a process for preparing a polymer clay nanocomposite dispersion comprising the steps of providing an aqueous suspension comprising a plurality of polymer latex particles adsorbed onto a plurality of clay particles and mobilizing the polymer within the suspension to form a polymer clay nanocomposite dispersion. In certain embodiments of the present invention, the mobilizing step comprises heating the suspension to a temperature and for a time to form a polymer clay nanocomposite. In other embodiments, the mobilizing step comprises the steps of providing a monomer mixture comprising at least one ethylenically unsaturated monomer, adding the monomer mixture to the aqueous suspension to form a reaction mixture, and polymerizing the monomer within the reaction mixture. In yet other embodiments, the mobilizing step comprises the steps of adding a coalescent to the aqueous suspension and optionally heating the aqueous suspension to a temperature and for a time to form the polymer clay nanocomposite dispersion.

An additional aspect of the present inventions is directed to a method for preparing a polymer clay nanocomposite dispersion and compositions incorporating same. In one embodiment, there is provided a process for preparing a polymer clay nanocomposite dispersion comprising the steps of providing an aqueous dispersion comprising a clay, at least one surfactant, and at least one polymer latex; and mobilizing the polymer within the dispersion to form the polymer clay nanocomposite. In certain embodiments of the present invention, the mobilizing step comprises heating the dispersion under sufficient time and temperature conditions to form a polymer clay nanocomposite. In other embodiments, the mobilizing step comprises the steps of providing a monomer mixture comprising at least one ethylenically unsaturated monomer, adding the monomer mixture to the aqueous dispersion to form a reaction mixture, and polymerizing the monomer within the reaction mixture. In yet other embodiments, the mobilizing step comprises the steps of adding a coalescent to the aqueous dispersion and optionally heating the aqueous dispersion to a temperature and for a time to form the polymer clay nanocomposite dispersion.

Yet another aspect of the present inventions is directed to a method for preparing a hydrophobically modified clay and compositions incorporating same. In one embodiment, there is provided a process for preparing a hydrophobically modified clay comprising the steps of providing an aqueous dispersion comprising a clay and at least one ion exchange resin to provide an acid clay and water mixture, introducing at least one basic compound to the acid clay and water mixture to form a reaction mixture; and heating the reaction mixture to provide a hydrophobically modified clay.

These and other aspects of the invention will become more apparent from the following detailed description.

DETAILED DESCRIPTION OF PREFERRED EMBODIMENTS

I. General

The present invention is directed to processes for preparing nanocomposite compositions, particles, colloids, and dispersions using hydrophobically modified clays in aqueous-based systems. Further, the present invention also provides processes for making a hydrophobically modified clay. In particular, the present invention provides methods for preparing a variety of aqueous based nanocomposite compositions using hydrophobically modified clays, that may be prepared in one or more stages through emulsion, suspension, solvent, bulk, or other polymerization methods. The present invention overcomes the processing difficulties, such as particle size, viscosity, or other attributes, that are typically encountered using hydrophobically modified clays of the prior art. The present invention also provides uses for these aqueous based nanocomposite compositions, such as, for example, coatings, sealants, thermosets, textiles, textile binders, caulks, adhesives, and as plastics additives.

For example, in connection with the preparation of aqueous nanocomposite dispersions, in certain embodiments of the present invention disclosed herein, one or more separate aqueous, monomeric reaction mixtures may be prepared initially which is followed by a multi-stage polymerization of the monomer within any one or all of the reaction mixtures. The order of polymerization as well as the polymerization method may vary depending upon the particular embodiment of the present invention. For example, in some embodiments, the aqueous reaction mixture is already polymerized via emulsion polymerization or other methods, to provide a polymer latex. The term "aqueous nanocomposite dispersion" relates to a clay and polymer nanocomposite that further comprises an aqueous, or water phase, and, optionally, other constituents. The term "stage" and "multi-stage", as used herein, is intended to encompass its broadest possible meaning, such as, for example, the meaning conveyed in U.S. Pat. No. 3,793,402, U.S. Pat. No. 3,971,835, U.S. Pat. No. 5,534,594, and U.S. Pat. No. 5,599,854, which disclose various means for achieving "staged" and "multi-staged" polymers. In certain embodiments comprising a two mixture system, the first aqueous reaction mixture typically comprises a monomer mixture whereas the second aqueous reaction mixture may comprise an aqueous clay dispersion and, optionally, a monomer mixture. In certain embodiments, the monomer mixture in the first and/or the second aqueous reaction mixtures may be emulsified in a separate process step such as, for example, embodiments involving polymer latexes. In one embodiment of the present invention, the percent weight of clay to the total amount of monomer within the aqueous nanocomposite dispersion can be in the range of from 0.05% to 20%, preferably from 0.1% to 15%, and more preferably from 0.1% to 10%, and even more preferably from 0.5% to 5%.

The aqueous nanocomposite dispersion, hollow particles, and colloids contain polymerized units derived from at least one type of ethylenically unsaturated monomer. The term "units derived from", as used herein, refers to polymer molecules that are synthesized according to known polymerization techniques wherein a polymer contains "units derived from" its constituent monomers. Preferably, the ethylenically unsaturated monomer is selected such that the polymerized units within the aqueous nanocomposite dispersion are water insoluble, i.e., have low or no water solubility. By "water-insoluble" it is meant having a water solubility of no greater than 150 millimoles/liter at 25° C. to 50° C.

The preparation of the monomer mixture typically involves the vigorous mixing of at least one ethylenically unsaturated monomer with water and, optionally, an emulsifier. In other embodiments of the present invention the monomer may be added "neat", i.e., added without water. The amounts of monomer, water, and emulsifier in the monomer mixture may vary depending upon, for example, the particular monomer and/or emulsifier selected, the intended end-use, the polymerization technique, and the like. In certain embodiments, the amount of monomer in the monomer mixture is preferably in the range of from 25 to 100, preferably from 40 to 90, and even more preferably from 60 to 80 weight percent. The amount of water in the monomer mixture, if aqueous based, is preferably in the range of from 0.1 to 75, more preferably from 10 to 60, and even more preferably from 20 to 40 weight percent based on the total weight of the emulsified monomer mixture (e.g., monomers, emulsifier, and water). The amount of emulsifier, if added, in the monomer mixture is preferably in the range of from 0.01 to 10, preferably from 0.05 to 2, and even more preferably from 0.1 to 1 weight percent.

The monomers which may be polymerized include any of the ethylenically unsaturated monomers commonly known in the art, such as those listed in *The Polymer Handbook*, $3^{rd}$ Edition, Brandrup and Immergut, Eds., Wiley Interscience, Chapter 2, (1989). Suitable ethylenically unsaturated monomers include, for example, the $C_1$–$C_{18}$ alkyl (meth)acrylate monomers (e.g., methyl-, ethyl-, propyl-, n-butyl-, sec-butyl-, tert-butyl, pentyl-, hexyl-, heptyl-, n-octyl-, 2-ethylhexyl-, decyl-, undecyl-, dodecyl-, lauryl, cetyl, and stearyl-(meth)acrylate and the like); vinyl aromatic monomers (e.g., styrene, alpha-methyl styrene, para-methyl styrene, chlorostyrene, vinyl toluene, dibromostyrene, tribromostyrene, vinyl naphthalene, isopropenyl naphthalene, divinylbenzene and the like); vinyl esters (e.g., vinyl acetate; vinyl versitate; and the like); vinyl-unsaturated carboxylic acids monomers (e.g., methacrylic acid, acrylic acid, maleic acid, itaconic acid); nitrogen-containing vinyl unsaturated monomers (e.g., acrylonitrile, methacrylonitrile, and $C_1$–$C_{18}$ alkyl (meth)acrylamides, and the like); dienes (e.g., butadiene and isoprene); and the like. The term Aalkyl (meth)acrylate®, as used herein, refers to both alkyl acrylate and alkyl methacrylate monomer compounds.

For the purposes of preparing nanocomposite compositions having desirable resistance to weathering, it is preferred to use monomers selected from the class of alkyl (meth) acrylates. For the purposes of providing low cost and commercially available aqueous nanocomposite dispersions, it is preferable that the ethylenically unsaturated monomer be selected from the group consisting of $C_1$–$C_{18}$ alkyl methacrylate, $C_1$–$C_{18}$ alkyl acrylate, acrylic acid, methacrylic acid, butadiene, vinylaromatic monomers, and the like. For the purposes of using the aqueous nanocomposite dispersions for preparing coatings and adhesives, it is preferable to use $C_1$–$C_{18}$ alkyl (meth)acrylate monomers; acrylic acid; methacrylic acid; itaconic acid; vinyl acetate; vinyl versitate; vinyl aromatic monomers, and the like. It may be even more preferable to use n-butyl acrylate, ethyl acrylate, butyl methacrylate, methyl methacrylate, styrene, butadiene, acrylic acid, and methacrylic acid monomers for the purpose of providing aqueous nanocomposite dispersions in a variety of applications due to their relatively low cost and commercial availability.

In certain embodiments of the present invention, one or more polyunsaturated monomers may be added to a reaction mixture, suspension, or dispersion which may, optionally, contain at least one ethylenically unsaturated monomer. As used herein, the polyunsaturated monomers may also be referred to as crosslinkers or graftlinkers. The term "crosslinker", as used herein, refers to multi-functional monomers capable of forming two or more covalent bonds between polymer molecules of the same type. The term "graftlinker", as used herein, refers to multi-functional monomers capable of forming two or more covalent bonds between polymer molecules of one type with polymer molecules of another type. The monomers which may be polymerized include any of the polyunsaturated monomers commonly known in the art, such as those listed in *The Polymer Handbook,* 4$^{rd}$ Edition, Brandrup and Immergut, Eds., Wiley Interscience, Chapter 2, (1998). Suitable polyunsaturated unsaturated monomers include, for example, the divinylbenzene, divinylpyridine, divinyltoluene, diallyl phthalate, ethylene glycol diacrylate, ethylene glycol dimethacrylate, divinylxylene, divinylethylbenzene, divinylsulfone, divinylketone, divinylsulfide, allyl methacrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols, and combinations thereof Still further non-limiting examples of polyunsaturated monomers include butylene glycol dimethacrylate, alkanepolyol-polyacrylates or alkane polyol-polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimeth-acrylate, trimethylol-propane triacrylate ("TMPTA") or trimethylolpropane trimethacrylate, and unsaturated carboxylic acid allyl esters such as allyl acrylate, diallyl maleate, and typically allyl methacrylate, and the like. Additional, non-limiting examples of polyunsaturated monomers are provided in U.S. Pat. No. 4,582,859.

In certain preferred embodiments, at least one of the monomers within the monomer-containing mixture is a polar monomer. The term "polar monomer", as used herein, describes a monomer with a partially or completely negative charge. Examples of these monomers include, but are not limited to, monomers containing acid, phosphate, or sulfate functional groups. Still further examples of polar monomers are monomers that include hydroxyl, ester, ether, amide, aldehyde and ketone functional groups. Preferably, the polar monomer is an acid containing monomer. The term "acid containing monomer", as used herein, refers to any ethylenically unsaturated monomer that contains one or more acid functional groups or functional groups that are capable of forming an acid, such as an anhydride, for example, methacrylic anhydride. Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof. In other embodiments of the present invention, the polar monomer comprises polar oligomers or unsaturated oligomers, such as trimers, that have a partially or completely negative charge and which have one or more points of unsaturation, such as terminal unsaturation. In certain other embodiments of the present invention, the polar monomer comprises low molecular weight polymeric stabilizers that may be soluble in base (i.e., contain many $CO_2H$ groups and are alkali soluble). Some non-limiting examples of these polar, polymeric stabilizers include MOREZ® or TAMOL® 731, both of which are manufactured by Rohm and Haas, Inc. of Philadelphia, Pa. In these embodiments, the amount of polar stabilizer within the system may range from 20 to 50 weight percent. In embodiments where the monomer mixture is emulsified, suitable emulsifiers may include, but are not limited to, those conventionally used in emulsion polymerization, such as salts of alkyl-, aryl-, aralkyl-, alkaryl-sulfates or sulfonates; alkyl-, aryl-, aralkyl-, alkaryl-poly(alkoxyalkyl) ethers; alkyl-, aryl-, aralkyl-, alkaryl-poly (alkoxyalkyl) sulfates; alkali salts of long-chain fatty acids such as potassium oleate, typically alkyl diphenyloxide disulfonate; and the like. The preferred emulsifiers may include, for example, dodecyl benzene sulfonate and dioctyl sulfosuccinate.

In embodiments where the reaction mixture may include a polymer latex or polymer latex particle, the polymer latex may be prepared, or polymerized, from any of the aforementioned monomers. Preferably, the polymer latex or polymer latex particles are polymerized in an aqueous medium in the absence of the clay particles. In one embodiment, the polymer latex is prepared via emulsion polymerization employing a monomer mixture including at least one polymerizable acid containing monomer, wherein the acid containing monomer may be selected from the group consisting of itaconic acid and dihydrogen phosphate esters of an alcohol, the alcohol containing a polymerizable olefinic group, phosphoric acid, or methacrylic acid. Additional monomers used in the polymer latex or polymer latex particles of the present invention are provided in, for example, WO 93/12184 Vogel et. al.

In certain embodiments, the reaction mixture may comprise an aqueous clay dispersion. The aqueous clay dispersions include at least 0.05, typically from 0.1 to 20, more typically from 0.1 to 15, even more typically from 0.1 to 10, and most typically from 0.5 to 5 weight percent of clay based upon the weight of the monomer in the aqueous nanocomposite dispersion. The amount of water present in the aqueous clay dispersion is from 70 to almost 100 weight percent. In certain embodiments, the aqueous clay dispersion may also include a monomer mixture comprising at least one ethylenically unsaturated monomer, such as the monomers disclosed herein. Preferably, at least one of the ethylenically unsaturated monomers within the mixture is a polar monomer. In embodiments wherein a monomer mixture is added to the aqueous clay dispersion, the weight percentage of the monomer within the aqueous clay dispersion may be from 0.01% to 100% by weight.

Suitable clays for the aqueous clay dispersion includes any natural or synthetic layered mineral capable of being intercalated or exfoliated. Examples of such clays may include, for example, layered silicate minerals. The layered silicate minerals that may be employed include natural and synthetic minerals capable of forming intercalation compounds. Examples of some naturally occurring minerals include, but are not limited to those known as, smectite, phyllosilicate, montmorillonite, saponite, beidellite, montronite, hectorite, stevensite, vermiculite, kaolinite and hallosite. Preferably among these minerals is montmorillonite. Some non-limiting examples of synthetic minerals, or synthetic phyllosilicates, may include LAPONITE®, which is manufactured by Laporte Industries, Ltd. of Charlotte, N.C., magadiite, and fluorohectorite.

Clays typically have at least one naturally occurring cation, or first cation, such as potassium, calcium, or sodium, present within their galleries that are attracted to the net negative charge of the clay surface. For example, clays like montmorillonite may be mined with a naturally occurring or first cation such as sodium or calcium. The terms "sodium form" or "calcium form" refer to clays that have a first cation which is sodium or calcium, respectively.

The cationic exchange capacity ("CEC") of the clay relates to the ion exchange capacity of the clay, or the total quantity of positive charge that can be absorbed onto the clay surface, expressed in terms of positive charges per unit mass of colloidal particles or "columns per unit mass" in SI units. It may also be measured in milliequivalents per gram (meq/g) or per 100 g (meq/100 g). A CEC of 1 meq/g is equivalent to 96.5 C/g in SI units. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g. In certain embodiments of the present invention, the clays selected preferably have higher CEC values. In preferred form, clays used in the present invention may have a CEC capacity of 40 meq/100 g or greater, preferably a CEC capacity of 70 meq/100 g or greater, more preferably a CEC capacity of 90 meq/100 g or greater, and even more preferably a CEC capacity of 100 meq/100 g or greater.

In the present invention, the clays within the aqueous clay dispersion may be either partially or completely exfoliated. Preferably, the clay is an at least partially exfoliated clay. The term "at least partially exfoliated clay", as used herein, generally refers to clay in which the layers have been completely or partially separated from one another. By contrast, the term "non-exfoliated clay" generally refers to the physical state of clay which does not exist as separated layers. Greater exfoliation of hydrophobically modified clays in polymers generally leads to more enhanced properties. The term "intercalated" generally refers to the state where polymers are interposed between the layers of the clay within the system. The term "partially intercalated" generally refers to the state wherein some of the clay layers within the system have polymer in between the layers and other clay layers do not. Any of the various states of polymer and clay systems may be used in the present invention.

Typically, the aqueous dispersions of completely ("fully") exfoliated clay are quite viscous and/or gelatinous at clay concentrations greater than a few percent. It should be appreciated to those skilled in the art that the exact weight percent (concentration) of clay which forms such a highly viscous gel depends on a number of factors, including but not limited to clay type, temperature, pH, and the like. Typically, the clay dispersion forms a free-flowing liquid rather than a viscous gel.

Some embodiments of the present invention may initially provide an unmodified clay in the aqueous clay dispersion. In certain embodiments, the unmodified clays may become hydrophobically modified in situ during the formation of the nanocomposite dispersion. Aqueous unmodified clay dispersions may be prepared by subjecting an aqueous clay mixture to shearing forces such as by mechanical mixing to partially and/or fully exfoliate the clay. Various high shearing methods to disrupt the physical integrity of clay particles in water to at least partially exfoliate the clay without requiring a surfactant are also envisioned. These methods include, but are not limited to, ultrasonication, megasonication, grinding/milling, high speed blending, homogenization, and the like. Although such high shearing methods may be used in the process of the present invention, these methods are not required to achieve an at least partially exfoliated state. In the various embodiments of this invention, the clay may include both exfoliated clay layers and non-exfoliated clay particles. In certain embodiments of the present invention, homogenization of the clay dispersion is not required.

In the present invention, limiting the degree of exfoliation to less than 100% complete in unmodified clays, i.e. partial exfoliation (less than 100%) typically provides aqueous clay dispersions that have reduced viscosities and/or a non-gelled liquid state. Hence, the portion of the clay that is exfoliated into clay layers typically provides the major contribution to viscosity increase while the non-exfoliated portion (i.e., clay particles) provides a minor contribution to the viscosity increase. Accordingly, the total amount of partially exfoliated clay in a aqueous clay dispersion is typically less than a few percent by weight, preferably 5% or less, more preferably 4% or less, and even more preferably 3% or less, based on the total weight of the dispersion. It is contemplated that the reduction of viscosity of the aqueous clay dispersion may be aided by dispersants, such as, but not limited to polyphosphates.

Hydrophobically modified clays may be used with the methods of the present invention. In certain embodiments of the present invention, the clays may be at least partially hydrophobically modified. As mentioned earlier, agents such as surfactants modify the surface chemistry of the clays, for example, by ion exchanging with the naturally occurring cations present within the clay. This results in an "intercalated" state wherein the surfactant is "sandwiched" between the individual layers replacing the naturally occurring cation. Some exemplary agents may include, but are not limited to, surfactants (e.g., amino acids, alkylammonium ions), silanes, aminomethylstyrene, or living free radical polymerization initiator ("LFRP").

Typical surfactants may include anionic, cationic, or nonionic surfactants having a hydrophilic head group and at least one oleophilic tail wherein the tails are selected from hydrogen and alkyl, alkenyl, and alkynyl groups having 4 to 30 carbon atoms. The term "cationic surfactant", as used herein, describes surfactants wherein the hydrophobic or hydrophilic moiety, preferably hydrophilic, carries a positive charge when dissolved in an aqueous media. Representative cationic surfactants may include onium salts such as, for example, salts comprising quaternary ammonium, quaternary phosphonium, or tertiary sulfonium cations or aliphatic mono-, di-, and polyamines derived from fatty and rosin acids. In the representative surfactants provided, the positive charge generally resides on an amino or quaternary nitrogen.

Some non-limiting examples of surfactants that may be used with certain embodiments of the present invention are found in U.S. Pat. No. 4,473,675 and U.S. Pat. No. 2,531,427. U.S. Pat. No. 4,473,675 discloses the use of quaternary ammonium compounds such as an admixture of a dimethyl di(hydrogenated tallow) ammonium compound from 10% to 90% by weight of a dimethyl benzyl(hydrogenated tallow) ammonium compound to modify a clay. U.S. Pat. No. 2,531,427 discloses the use of onium compounds that are defined by the type RXHy, which are isologs of ammonium of ammonium and contain the element X wherein X may be pentavalent as in ammonium, phosphonium, arsonium, and stibonium; tetravalent such as in oxonium, sulfonium, selenium, and stannonium compounds; trivalent such as in iodonium compounds and may be considered addition compounds of oxonium, carbonium, or stibonium. Further compounds provided in U.S. Pat. No. 2,531,427 include salts of aliphatic, cyclic, aromatic, and heterocyclic amines, primary, secondary, and tertiary amines and polyamines, and quaternary ammonium compounds such as monovalent or polyvalent onium compounds such as triphenylalkyl phosphonium-asonium-stibonium-halides, or dialkyl-, or aryl-sulphonium and selenonium halides and pyrones, such as 2,5-dialkyl gamma pyrone hydrochloride.

In some embodiments of the present invention, a clay may be hydrophobically modified by an acid ion exchange process. The term "acid ion exchange process", as used herein, comprises adding an ion exchange resin to the clay to render the clay more acidic by exchanging hydrogen ions for cations on the surface of the clay. The term "acid clay", as used herein, refers to a clay that is treated with an ion exchange resin. Ion exchange resins are generally polymeric compounds that contain positively or negatively charged chemical reactive groups that can attract an ion of opposite charge from a surrounding solution. The electrically charged groups may include, for example, sulfonic or carboxylic acid salts or quaternary ammonium salts. Polymers containing acid groups are generally classified as "acid", or "cation exchangers", because they exchange positively charged ions, such as hydrogen ions and metal ions; polymers containing ammonium groups are generally classified as "basic", or "anion exchangers", because they exchange negatively charged ions, usually hydroxide ions or halide ions. Some non-limiting examples of ion exchange resins include styrene-divinylbenzene copolymers, methacrylic acid-divinylbenzene polymers, and phenol-formaldehyde polymers. Further examples of ion exchange resins are provided in Robert Kunin, *Ion Exchange Resins*, 2nd ed. (1958, reprinted 1990). Preferably, a cation exchange resin such as AMBERLITE® IRN-77, which is manufactured by Rohm and Haas Co. of Philadelphia, Pa., may be used in certain embodiments of the present invention. The amount of ion exchange resin, which is preferably added to the aqueous clay dispersion in large excess depending upon batch size, is preferably from 50,000% to 100%, more preferably from 10,000% to 1,000%, and even most preferably from 8,000% to 4,000% by weight, based upon the dry weight of the clay in the aqueous dispersion.

In certain embodiments of the present invention, an acid clay may be prepared prior to the formation of a polymer clay nanocomposite. In this connection, an acid clay may be prepared by providing an aqueous dispersion containing one or more clays, deionized water, and an ion exchange resin. The dispersion is stirred for a certain time and temperature. Preferably, the aqueous dispersion is stirred for a period of 2 to 24 hours, preferably 4 to 12 hours, and even more preferably 6 to 10 hours. The temperature conditions at which the aqueous dispersion is stirred is preferably from 20° C. to 120° C., more preferably from 50° C. to 100° C., and most preferably from 60° C. to 80° C. The ion exchange resin is removed from the dispersion, preferably through filtration or similar means, to provide an acid clay and water mixture.

In certain embodiments of the present invention, the clay within the acid clay and water mixture may be hydrophobically modified through exposure to a basic compound. The "basic compound", as used herein, relates to any compound capable of interacting with the acid clay such as accepting a proton from the acid clay. Advantageously, this interaction results in the production of water, such as the reaction of a quaternary ammonium hydroxide with an acid clay, as opposed to the typical practice of treating the acid clay with quaternary ammonium halide. Examples of basic compounds that may be used in the present invention include, but are not limited to, water soluble bases, such as primary, secondary, or tertiary amines, or hydroxides of a pyridine base or a quaternary ammonium. Among the preceding examples, quaternary ammonium hydroxide is preferred. The use of quaternary ammonium hydroxide over an analogous compound such as a chloride results in a product with lower salt content. The basic compound may be added to the acidic clay through combining an aqueous solution having the basic compound into the acid clay and water mixture. Alternatively, the basic compound may be added neat. The amount of basic compound which is added to the acid clay and water mixture is preferably from 0.1 to 3, more preferably from 0.2 to 1.5, and most preferably from 0.5 to 1.2 meq/g based on the CEC of the clay in the aqueous dispersion.

The aqueous solution having the basic compound and the acid clay and water mixture, or the combined mixture, are stirred under certain time and temperature conditions to hydrophobically modify the clay. Preferably, the combined mixture is stirred for a period of 2 to 24 hours, more preferably 4 to 12 hours, and most preferably 6 to 10 hours. The temperature conditions at which the combined mixture is stirred is preferably from 60° C. to 120° C., more preferably from 70° C. to 110° C., and most preferably from 80° C. to 100° C. The clay is removed from the combined mixture, preferably through filtration or similar means, rinsed, dried to remove excess water from the clay, and ground to yield a hydrophobically modified clay.

In certain embodiments, the aqueous clay dispersions, reaction mixtures, and/or aqueous suspensions, are dispersed via agitation. In embodiments wherein the mixture comprises clay, any mechanical mixing device may be suitable as long as the clay particles are at least partially exfoliated. More preferably, the clay particles are mixed to uniformly disperse the clay within the nanocomposite dispersion. For example, a COWLES™ mechanical mixer may be used to prepare modified aqueous clay dispersions containing up to 20% clay, however it is more preferable to use a mechanical homogenizer to prepare aqueous clay dispersions containing from 0.1 to 10% clay. An additional non-limiting example of agitation may include ultrasonification or other suitable means.

The polymerization step is typically carried out in a suitable reactor wherein the reactants (monomers, initiators, optional emulsifiers, aqueous clay dispersion, and optional chain transfer agents) are suitably combined, mixed, and reacted in an aqueous medium, and wherein heat may be transferred into, and away from, the reactor. The reactants are preferably added slowly (gradually, as in a semi-batch process) over time, continuously, or quickly as a "shot" (batchwise) into the reactor.

Various initiator systems are known in the art of free radical initiation and may be used in the methods described herein. The selection of the initiator system may vary depending upon the polymerization technique used. Examples of such systems include, for example, persulphate, azo, or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. The free-radical initiators which are typically used in the various steps of the process are those conventionally utilized in free-radical redox polymerizations conducted in the temperature range from 10° C. to 100° C., preferably from 20° C. to 95° C., and more preferably from 55° C. and 90° C. Temperatures higher than 100° C. are possible using equipment that is designed for elevated pressures. In some embodiments involving redox initiation, initiation temperatures are preferably kept below 85° C., more preferably below 60° C. for redox initiation. In other embodiments involving thermal initiation with persulfate salts, temperatures in the range 80° C. to 90° C. are used.

In one embodiment of the present invention, the monomers may be added batch-wise ("shot") or fed continuously over time into the reactor. Continuous feeding by gradual addition of the aqueous reaction mixtures into the reactor over times from 0.5 to 18 hours, preferably from 1 to 12 hours, and even more preferably from 2 to 6 hours, is useful for controlling reaction temperature.

Optionally, at least one chain transfer agent may be incorporated during polymerization to control the molecular weight of the polymer. Chain transfer agents or mixtures thereof are known in the art, such as but not limited to alkyl mercaptans, and may be used to control molecular weight.

II. Preparation of Nanocomposite Dispersion via Suspension Polymerization

In certain embodiments of the present invention, there is provided a process for preparing an aqueous nanocomposite dispersion, wherein the process comprises: polymerizing via suspension polymerization a suspension comprising at least one ethylenically unsaturated monomer and a hydrophobically modified clay to form the nanocomposite dispersion after polymerization, wherein the hydrophobically modified clay is dispersed in the monomer. The amount of monomer that is present in the suspension is from 30% to 99%, preferably from 45% to 99%, and more preferably from 60% to 98% by weight based upon the dry weight of ingredients within the suspension. Suspension polymerization, as used herein, generally involves dispersing a suspension of one more monomers in a liquid medium wherein the monomer is polymerized as droplets. The liquid medium is preferably water, however other media, such as perfluorocarbons, may also be used. The addition of one or more stabilizers to the suspension, along with mechanical agitation, aid in preventing agglomeration of the monomer droplets. Further non-limiting examples of suspension polymerization are provided in George Odian, *Principles of Polymerization* 2nd ed. John Wiley and Sons, NY (1981), pp 287–288.

Dispersion polymerization, as used herein, is a variation of suspension polymerization. However, the initiators and dispersants used in dispersion polymerization may be water soluble whereas in suspension polymerization the dispersants may be water insoluble if the liquid medium is water. Some non-limiting examples of water insoluble, inorganic stabilizers or dispersants that may be used with certain embodiments of the present invention include, for example, hydroxyapatite, barium sulfate, kaolin, and magnesium silicates. Examples of water soluble stabilizers or dispersants may include, for example, organic polymers such as gelatin, methyl cellulose, poly(vinyl alcohol), and alkali salts of poly(methacrylic acid), and optionally, in conjunction with inorganic electrolytes. Additional stabilizers or dispersants, that may be used in certain embodiments of the present invention, are provided, for example, in U.S. Pat. No. 4,582,859. Preferably, the stabilizers used within the suspension are dispersable or soluble within the liquid medium which may be water or another solvent. The amount of stabilizers or dispersants that may be added to the suspension is from 0.01% to 10%, preferably from 0.01% to 5%, and even more preferably from 0.01% to 2% by weight, based upon the dry weight of ingredients within the suspension. Optionally, a salt may be added, in quantities ranging from 0% to an unlimited amount, to the suspension to reduce the solubility of the monomer within the liquid medium. The initiators that may be added to the suspension varies depending upon the polymerization technique and liquid medium utilized. Depending upon the polymerization technique and the liquid medium used, the initiators may be water insoluble.

In certain preferred embodiments of the present invention, there is provided a process for preparing an aqueous nanocomposite dispersion, wherein the process comprises: providing at least one stabilizer wherein the stabilizer is soluble or dispersable within a liquid medium; providing a clay dispersion comprising a hydrophobically modified clay and at least one ethylenically unsaturated monomer; adding the clay dispersion to the at least one stabilizer; and polymerizing the monomer to form the nanocomposite dispersion.

The number average diameter of the polymer and clay nanocomposite particles formed from the suspension polymerization methods of present invention may range from 1 to 10,000 µm.

III. Preparation of Hollow, Polymer Clay Nanocomposite Particles

In certain embodiments of the present invention, there is provided a process for preparing a plurality of hollow, polymer clay nanocomposite particles. In preferred embodiments, the process comprises the steps of providing a polymer seed dispersion comprising polymer seeds and a hydrophobically modified clay, combining the polymer seed dispersion with an at least one polyunsaturated monomer and, optionally, at least one ethylenically unsaturated monomer to provide a reaction mixture, and polymerizing the monomer within the reaction mixture to form the hollow polymer clay nanocomposite particles. In certain preferred embodiments of the present invention, the providing step further comprises swelling the polymer seeds within a solvent and evaporating the solvent within the polymer seeds wherein the polymer seeds have a number average diameter of 10 µm or below. These steps may be performed in a variety of different orders. For example, the hydrophobically modified clay may be introduced in the polymer seed suspension or with the solvent and/or monomer mixture.

In the preferred embodiment, the mixture of monomers may be polymerized in the presence of a polymer seed dispersion for controlling the desired particle size. The polymer seeds may be prepared in a separate step via dispersion polymerization of one of more ethylenically unsaturated monomers in an aqueous suspension comprising one or more stabilizers and initiators. The dispersion is subjected to time, temperature, and atmospheric conditions to polymerize the monomer within the suspension. The article, Okubo et al., "Release of toluene from micron-sized monodispersed, cross-linked, hollow polymer particles", Colloid Polym. Sci. 279:77–81 (2001) provides an example of how a polymer seed particle is produced.

Polymer seeds are also typically used for controlling the structure and/or morphology of the resulting polymer. The polymer seed dispersion may comprise small particles, having a number average particle diameter less than 20 µm, preferably less than 10 µm and even more preferably less than 2 µm. Typical seed particles may have a composition similar to, or different than, the composition of the monomers used in monomer mixture. The polymer seed dispersion may include polymer particles of a rubbery material, and may be similar or different in composition to the core polymer. The term Arubbery@, as used herein, denotes the thermodynamic state of a polymer above its glass transition temperature or Tg. Alternatively, the seeds may include hard non-rubbery polymer particles, (e.g., polystyrene or polymethyl methacrylate), which may be used for adjusting refractive index, as taught in Myers et al., U.S. Pat. No. 3,971,835.

Preferably, the polymer seed dispersion may further comprise a hydrophobically modified clay. In certain embodiments of the present invention, the hydrophobically modified clay may be introduced in the polymer seed suspension. The polymer seed dispersion is combined with a monomer mixture, that preferably comprises at least one polyunsaturated monomer and optionally at least one ethylenically unsaturated monomer, to provide a reaction mixture. The ratio of monomer within the reaction mixture to polymer seeds is 2 to 50, preferably 2 to 25, and more preferably 2 to 10, based on respective dry weight of monomer to polymer seeds.

The polymer seeds within the reaction mixture, which may or may not contain the hydrophobically modified clay depending upon the order of addition, are "swollen" within a solvent under controlled time, temperature, and atmospheric conditions. U.S. Pat. No. 5,043,404 and U.S. Pat. No. 5,215,847, as well as the articles, Okubo et al., "Release of Toulene from Micron-Sized, Monodispersed, Cross-Linked, Hollow Polymer Particles", Colloid Polymer Science 279: 77–81 (2001) and Okubo et al., "Production of Micron-Sized Monodispersed Cross-Linked Polymer Particles Having Hollow Structure", Macromol. Symp. 101, 509–516 (1996), provide methods for the swelling of polymer seed particles, referred to in some references as the "dynamic swelling method", within a monomer mixture. Examples of solvents that may be used in the swelling step include, but are not limited to, xylene or toluene. Preferably, the ratio of solvent to polymer seed is 5:1. In some embodiments of the present invention, the hydrophobically modified clay may be introduced with the solvent and/or monomer mixture. The amount of monomer within the reaction mixture may influence the particle size of the resultant hollow nanocomposite particles. It is believed that larger quantities of monomer within the reaction mixture will produce particles having number average particle size diameters of 5 µm or greater. After the polymer seeds are swollen and the solvent evaporates, the monomer within the reaction mixture is polymerized thereby forming the hollow polymer clay nanocomposite particles.

The number average diameter of the hollow, polymer and clay nanocomposite particles formed may range from 1 to 10 µm. The Tg of the hollow, polymer and clay nanocomposite particles formed may range from −80° C. to 140° C.

IV. Preparation of Polymer Clay Nanocomposite Colloids via Mini-emulsion Polymerization In certain embodiments of the present invention, there is provided a method for the preparation of polymer clay nanocomposite colloids wherein the method comprises: polymerizing via mini-emulsion polymerization a suspension comprising at least one ethylenically unsaturated monomer and a hydrophobically modified clay to form the nanocomposite colloid after polymerization, wherein the hydrophobically modified clay is dispersed in the monomer. In certain preferred embodiments of the present invention, there is provided a method for preparing a polymer clay nanocomposite colloid comprising: providing an aqueous mixture comprising at least one surfactant; providing a hydrophobically modified clay, an at least one ethylenically unsaturated monomer, optionally at least one surfactant, and optionally at least one co-surfactant to provide a clay dispersion; adding the clay dispersion to the aqueous mixture under agitation conditions to provide a monomer clay aqueous dispersion; processing the monomer clay aqueous dispersion to provide a plurality of mini-emulsion droplets comprising the monomer and the clay; and polymerizing the monomer within the mini-emulsion droplets to form the polymer clay nanocomposite colloid.

The term "colloid" as used herein refers to composite particles having a number average particle size range from 0.05 to 1 µm. The term "mini-emulsion polymerization", as used herein, generally relates to methods involving stable submicron oil-in-water dispersions in which the monomer droplets within the dispersion may range in size from 0.05 to 1 µm. Further discussion of mini-emulsion polymerization techniques is provided in "Miniemulsion Polymerization" by E. D. Sudol et al., *Emulsion Polymerization and Emulsion Polymers*, John Wiley and Sons, NY (1997), pp. 700–722. The references, Erdem et al., "Encapsulation of Inorganic Particles via Miniemulsion Polymerization", Proc. Am. Chem. Soc. (Div Polym Mater Sci Eng) 1999, 80, 583 and Erdem et al., "Encapsulation of Inorganic Particles via Miniemulsion Polymerization. III. Characterization of Encapsulation", Journal of Polymer Science: Part A: Polymer Chemistry, Vol. 38, 4441–4450 (2000), provides some exemplary methods for mini-emulsion polymerization. The dispersion is typically obtained by shearing a system comprising oil, water, surfactant, and, optionally, a co-surfactant. Due to the small droplet size of the aqueous dispersion, it is believed that the monomer droplets within the miniemulsion may become the dominant site for particle nucleation.

The stability of the monomer droplets within the miniemulsion may arise from the use of a stabilizer in conjunction with an optional costabilizer. The stabilizer may include, for example, any of the surfactants mentioned herein. In embodiments where a costabilizer is used, the costabilizer is preferably a low molecular weight, water insoluble compound such as, for example, cetyl alcohol, hexane, or hexadecanol. The amount of surfactant that may be added to the mixture is from 0.1% to 10%, preferably from 0.5% to 5%, and more preferably from 1% to 3.4% by weight, based upon the weight of monomer within the mixture. The amount of co-surfactant, if added, to the mixture is from 0.1% to 15%, preferably from 1% to 10%, and more preferably from 2% to 8% by weight, based upon the weight of monomer within the mixture.

In certain embodiments of the present invention, the hydrophobically modified clay is dispersed within the mixture comprising at least one ethylenically unsaturated monomer, at least one surfactant, and optionally, at least one co-surfactant to provide a clay dispersion. The dispersion further includes a water soluble initiator such as, for example, any of the water soluble initiators mentioned herein. The clay dispersion may be added to an aqueous mixture that comprises at least one surfactant to provide a monomer clay aqueous dispersion. The step of adding the clay dispersion to the aqueous mixture preferably occurs under controlled conditions, such as time, temperature, rate of adding, etc., and under agitation. Agitation may be accomplished through, for example, vigorous stirring of the monomer clay aqueous mixture and/or sonification (i.e., ultrasonic agitation) for a certain period of time. For example, the clay dispersion may be slowly added to the aqueous mixture under stirring for 20 minutes and then sonified for various time intervals up to 30 minutes using a sonifier such as a Branson Inc., Model 450 Sonifier, manufactured by Branson of Danbury, Conn.

The monomer clay aqueous dispersion is processed to provide a mini-emulsion comprised of a plurality of miniemulsion droplets that comprise the monomer and the clay. The term "processed" or "processing" as used herein, refers to forming the mini-emulsion droplets from the monomer clay aqueous dispersion via ultrasonification, high shearing, microfluidization, homogenization, or other suitable means. The monomer clay aqueous dispersion is preferably processed via a microfluidizer, such as, for example, a Microfluidics Model 110 T Microfluidizer that is manufactured by Microfluidics Inc. of Newton, Mass. The mini-emulsion is then polymerized using any of the polymerization techniques known in the art or disclosed herein to form the polymer clay nanocomposite colloid. The particle size of the resultant colloid particles have a number average particle diameter that ranges from 0.05 to 1, preferably from 0.08 to 1, and even more preferably from 0.08 to 0.5 μm. The resultant properties of the nanocomposite colloid will vary depending upon monomer(s) or other additives that are added to the dispersion. However, it is preferable that the Tg of the nanocomposite colloid range from −80° C. to 140° C., preferably from −40° C. to 60° C., and more preferably from −10° C. to 30° C. For the purpose of this invention, the Tg is to be calculated by the Fox equation using the overall composition of the nanocomposite.

V. Preparation of Polymer Clay Nanocomposite Dispersion via Latex Adsorption

The present invention also encompasses methods for preparing a polymer clay nanocomposite dispersion, wherein the method comprises: providing an aqueous suspension comprising a plurality of polymer latex particles adsorbed onto a plurality of clay particles; and mobilizing the polymer within the aqueous suspension to form a polymer clay nanocomposite dispersion. The term "mobilizing" as used herein refers to any method in which the polymer chains within the polymer latex particles become mobilized within the suspension and a least partially intercalate and/or exfoliate the clay within the suspension. Some non-limiting examples of methods for mobilizing the polymer include heating, adding a coalescent, or adding a monomer to the suspension.

The polymer latex particles within an aqueous suspension may be absorbed onto clay particles using a variety of methods. One method to accomplish this is provided in WO 93/12184. In certain embodiments, an aqueous suspension is prepared comprising one or more polymer latexes. The latexes used may be anionic, cationic, or non-ionic. The solids content of the latex is from 5% to 65%, preferably from 20% to 65%, and more preferably from 30% to 50% by weight. Preferably, the polymer latex may be comprised of from 0.3% to 15%, preferably from 0.5% to 10%, and more preferably from 0.5% to 5% by weight of acid containing monomer to enhance the affinity between the clay and the latex in the resultant reaction mixture. A quantity of hydrophobically modified clay is then added to the aqueous suspension to form a latex clay dispersion. The amount of clay that is added to the suspension is from 600% to 2%, preferably from 200% to 3%, and more preferably from 100% to 5% by weight, based upon dry weight of the solids within the polymer latex. Other additives that may optionally be added to the latex clay dispersion include, but are not limited to, dispersants, surfactants, and/or glycols. The latex clay dispersion is subjected to agitation, such as shear forces, under certain time, temperature, and atmospheric conditions to allow the latex particles to spontaneously absorb onto the surface of the clay particles thereby forming composite particles suspended within an aqueous medium. Preferably, the latex clay mixture is stirred for a period of 0.5 to 24 hours, more preferably 0.5 to 12 hours, and most preferably 0.5 to 10 hours.

The polymer within the aqueous suspension is mobilized to form the polymer clay nanocomposite. In embodiments where mobilizing the polymer is performed through heating, the temperature conditions at which the aqueous suspension is heated is 20° C. above, more preferably 30° C. above, and most preferably 50° C. above the Tg of the polymer latex contained therein. In embodiments where mobilizing the polymer is performed through adding a monomer, a monomer mixture comprising at least one ethylenically unsaturated monomer is added to the aqueous suspension, comprising the composite particles of polymer latex absorbed onto the surface of the clay particles, to form a reaction mixture. The amount of monomer that is added to the aqueous suspension is from 0.1% to 25%, preferably from 0.5% to 15%, and more preferably from 1% to 10% by weight, based upon the dry weight of the solid ingredients within the aqueous suspension. The reaction mixture is subjected to time and temperature conditions sufficient to polymerize the monomer within the reaction mixture. In embodiments where mobilizing the polymer is performed through adding a coalescent, the amount of monomer that is added to the aqueous suspension is from 0.1% to 25%, preferably from 0.5% to 15%, and more preferably from 1% to 10% by weight, based upon the dry weight of the solid ingredients within the aqueous suspension. An example of a coalescent or coalescing agent that may be used includes, but is not limited to, DOWANOL® DPM coalescent (manufactured by Dow Chemical of Midland, Mich.). Optionally, after adding the coalescent, the aqueous suspension may be heated to a temperature and for a time to form a polymer clay nanocomposite dispersion. In yet another embodiment, the mobilizing step comprises adding a plasticizier such as dioctyl phthalate to the aqueous suspension.

The number average diameter of the polymer and clay nanocomposite particles formed by the latex adsorption methods of the present invention may range from 0.05 to 10 μm, preferably from 0.08 to 5 μm, and more preferably from 0.01 to 2 μm. This range may vary due to the size of the latex particles contained therein.

VI. Preparation of Hydrophobically Modified Clay in the Presence of Latex

In other embodiments of the present invention, the clay may be hydrophobically modified in the presence of a polymer latex. In one embodiment, the latex is stabilized by the same agents as that which modifies the clay. In this connection, the present invention provides methods for preparing a polymer clay nanocomposite dispersion, wherein the method comprises: providing an aqueous dispersion comprising a clay, at least one clay modifying agent, and at least one polymer latex and mobilizing the polymer within the aqueous dispersion to form a polymer clay nanocomposite dispersion. The term "clay modifying agent" relates to any agent that may be used, such as a surfactant, silane, or other agents mentioned herein, that may be used to hydrophobically modify the clay.

In certain embodiments of the present invention, a polymer latex may then be added to an aqueous mixture comprising water and unmodified clay to form an aqueous latex clay mixture. To this latex clay mixture, a quantity of clay modifying agent, such as a surfactant, is added with vigorous stirring under time and temperature conditions sufficient to form a polymer clay nanocomposite. Preferably, the latex clay mixture is stirred for a period of 2 to 24 hours, more preferably 4 to 12 hours, and most preferably 6 to 10 hours. The temperature conditions at which the latex clay mixture is stirred is preferably from 20° C. to 120° C., more preferably from 50° C. to 100° C., and most preferably from 60° C. to 80° C. The total quantity of surfactant or silane, if added to the latex clay mixture to hydrophobically modify the clay, is preferably from 0.1 to 25, more preferably from 0.2 to 10, and most preferably from 0.5 to 5 meq/1 based upon the CEC of the clay.

As mentioned previously, the mobilizing step comprises any method in which the polymer chains within the polymer latex particles become mobilized within the dispersion and at least partially intercalate and/or exfoliate the clay within the dispersion. Some non-limiting examples of methods for mobilizing the polymer include heating, adding a coalescent, adding a plasticizer, or adding a monomer to the dispersion. In some embodiments of the present invention the mobilizing step comprises: providing a monomer mixture comprising at least one ethylenically unsaturated monomer may be added to the latex clay mixture to form a reaction mixture. The monomer(s) may be the same or differ from the monomers that are polymerized within the latex. The amount of monomer within the monomer mixture that is added to the latex clay mixture is preferably from 0.1% to 25%, more preferably from 0.5% to 15%, and most preferable 1% to 10% by weight based upon dry weight of solids. The monomer or monomers within the reaction mixture is polymerized to form the nanocomposite. In embodiments where mobilizing the polymer is performed through adding a coalescent, the amount of monomer that is added to the aqueous dispersion is from 0.1% to 25%, preferably from 0.5% to 15%, and more preferably from 1% to 10% by weight, based upon the dry weight of the solid ingredients within the aqueous dispersion. An example of a coalescent or coalescing agent that may be used includes, but is not limited to, DOWANOL®DPM coalescent (manufactured by Dow Chemical of Midland, Mich.). Optionally, after adding the coalescent, the aqueous dispersion may be heated to a temperature and for a time to form a polymer clay nanocomposite dispersion. In yet another embodiment, the mobilizing step comprises adding a plasticizier such as dioctyl phthalate to the aqueous dispersion.

In other embodiments of the present invention, the clay is hydrophobically modified by an acid clay ion exchange process and then used to make a nanocomposite dispersion. In this connection, there is provided a method for preparing a polymer clay nanocomposite dispersion, wherein the method comprises the steps of: providing an aqueous dispersion comprising a clay and an at least one ion exchange resin to provide an acid clay and water mixture; introducing an at least one basic compound and a polymer latex to the acid clay and water mixture to form a reaction mixture; and mobilizing the polymer within the reaction mixture to form a polymer clay nanocomposite.

The number average diameter of the polymer and clay nanocomposite particles formed by the methods of the present invention, involving preparing hydrophobically modified clay in the presence of latex, may range from 0.05 to 10 µm, preferably from 0.08 to 5 µm, and more preferably from 0.01 to 2 µm. This range may vary due to the size of the latex particles contained therein.

VII. Applications

The aqueous nanocomposite clay-polymer dispersions may be useful, for example, as coatings, sealants, caulks, adhesives, and as plastics additives. The coating compositions comprising aqueous nanocomposite clay-polymer dispersions may exhibit improved properties like block, print and dirt pick-up resistance, enhanced barrier properties, and enhanced flame resistance. Additionally, the coating compositions comprising the aqueous nanocomposites of the present invention may have the ability to utilize softer binders, without the need for additional coalescant (solvents) for film formation, and still maintain sufficient hardness, toughness and lower tack in a dried film. Suitable applications for the coating compositions of the present invention may include architectural coatings (particularly low VOC applications for semi-gloss and gloss); factory applied coatings (metal and wood, thermoplastic and thermosetting); maintenance coatings (e.g., over metal); automotive coatings; concrete roof tile coatings; elastomeric roof coatings; elastomeric wall coatings; external insulating finishing systems; and inks. It is further contemplated that the aqueous nanocomposite dispersions, when provided as an additive to a coating application, may impart hardness. A further application for the aqueous nanocomposite dispersion is for an opaque polymer and hollow sphere pigments. The inclusion of the aqueous nanocomposite dispersions may provide, for example, harder, more collapse resistant shells or may be suitable for the modification of fibers. Yet further non-limiting examples of applications for the aqueous clay-polymer nanocomposite dispersions: polish; binders (such as binders for nonwovens, paper coatings, pigment printing, or ink jet); adhesives (such as pressure sensitive adhesives, flocking adhesives, or other water based adhesives); plastics additives; ion exchange resins; hair fixatives; caulks; traffic paint; and sealants. The aqueous clay-polymer nanocomposite dispersion may impart strength and toughness to the aforementioned applications.

In one embodiment of the present invention, the aqueous nanocomposite dispersions are capable of forming films upon drying (e.g., coatings and adhesives). In this embodiment, it is preferred that the polymers of the nanocomposites have a glass transition temperature in the range of from −80° C. to 50° C. Glass transition temperatures may be calculated by using the Fox equation (see T. G. Fox, Bull. Am. Physics Soc., Vol. 1, Issue No. 3, page 123(1956)).

An additional embodiment of the present invention contemplates preparing a coating composition containing an aqueous nanocomposite dispersion. The coating composition may further include pigments and/or fillers such as, for example, titanium dioxide, iron oxide, zinc oxide, magnesium silicate, calcium carbonate, organic and inorganic colored pigments, and clays other than layered clay. Such pigmented coating compositions preferably contain from 3 to 70% pigment on a volume basis, and more preferably from 15 to 60% titanium dioxide on a volume basis.

The coating compositions of the present invention may be used, for example, as clear coatings, flat coatings, satin coatings, semi-gloss coatings, gloss coatings, primers, textured coatings, primers, caulks, sealants, mastics, adhesives, and the like. The coating composition may be prepared by a variety of techniques that are well known in the coatings art. In certain embodiments, at least one pigment is well dispersed in an aqueous medium under high shear mixing, such as by a COWLES® mixer or, alternatively, at least one predispersed pigment may be used. Then, the aqueous nanocomposite dispersion is added to the aqueous pigment mixture under low shear stirring along with other coatings adjuvants, if desired. Alternatively, the aqueous nanocomposite dispersion may be included in the optional pigment dispersion step. Conventional coating adjuvants that may be added to the coating composition include, for example, tackifiers, emulsifiers, coalescing agents, buffers, neutralizers, thickeners or rheology modifiers, humectants, wetting agents, biocides, plasticizers, antifoaming agents, colorants, waxes, anti-oxidants, and the like. The coating composition, in addition to the aqueous nanocomposite dispersion described herein, may also contain at least one or more additional polymers. These additional polymers are preferably emulsion polymers selected from either film-forming and non-film-forming emulsion polymers that include solid or hollow polymeric pigments, and may be present at a level of 0–200%, based on dry weight of the total dry polymer weight in the nanocomposite dispersion.

The solids content of the coating composition may be from 10% to 70% by volume. The viscosity of the coating composition may be from 0.05 to 100 Pascal-seconds (Pa.s), or 50 to 100,000 centipoise (cP), as measured using a Brookfield viscometer. The viscosity of the coating composition may vary depending upon the method of coating application.

The coating composition may applied by conventional application methods such as, for example, brushing and spraying methods such as, for example, roll coating, doctor-blade application, printing methods, air-atomized spray, air-assisted spray, airless spray, high volume low pressure spray, air-assisted airless spray, and extrusion.

The coating composition may be applied to a variety of substrates such as, for example, paper, glass, plastic, wood, metal, roadways, primed surfaces, previously painted surfaces, and cementitious substrates.

The coating composition applied to the substrate is preferably dried, or allowed to dry, at a temperature of from 10° C. to 95° C.

In another embodiment of this invention, caulking and sealant compositions containing an aqueous nanocomposite dispersion are provided. The various components, processes, and uses of the aforementioned coating compositions are preferably applicable to these nanocomposite-containing caulking and sealant compositions. In addition, caulking and sealant compositions preferably have a paste-like or gel-like consistency and preferably have higher viscosities than do coatings. Accordingly, caulks and sealants can be prepared using the aqueous nanocomposite dispersions of the present invention according to the general formulations known in the art of preparing caulks and sealants from emulsion polymers. In this embodiment, caulks and sealants can be prepared by blending fillers with the aqueous nanocomposite dispersions according to methods known in the art.

In some embodiments of this invention, the aqueous nanocomposite dispersions desirably form films upon drying, with or without the addition of plasticizers or coalescents (e.g., coatings and adhesives). In these embodiments, it is preferred that the polymers of the nanocomposites have glass transition temperatures in the range of from −80° C. to 100° C.

In one embodiment of the present invention, a coating composition containing an aqueous nanocomposite dispersion is prepared. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the nanocomposites have glass transition temperatures in the range from 0° C. to 70° C.

The coating composition of the present invention may further include pigments and/or fillers such as, for example, titanium dioxide, iron oxide, zinc oxide, magnesium silicate, calcium carbonate, organic and inorganic colored pigments, and clays other than layered clay. Such pigmented coating compositions typically contain from 3 to 70% pigment on a volume basis, or more preferably from 15 to 60% titanium dioxide on a volume basis. The coating composition may be prepared by techniques that are well known in the coatings art. First, optionally, at least one pigment is dispersed within an aqueous medium under high shear such as is afforded by a COWLES® mixer or, alternatively at least one predispersed pigment may be used. Then, the aqueous nanocomposite dispersion may be added under low shear stirring along with other coatings adjuvants, as desired. Alternatively, the aqueous nanocomposite dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous nanocomposite dispersion described herein, may also contain at least one additional polymer, preferably an additional emulsion polymer(s) selected from film-forming and non-film-forming emulsion polymers, including, but not limited to polymeric pigments, such as solid particles, particles having a single void, or multivoided particles. These additional polymers, if added to the coating composition of the present invention, may be present at a level of 0–200%, based on dry weight of the total dry polymer weight in the nanocomposite dispersion.

The solids content of the coating composition may be from 10% to 70% by volume. The viscosity of the coating composition may be from 0.05 to 100 Pascal-seconds (Pa.s), or 50 to 100,000 centipoise (cP), as measured using a Brookfield viscometer; the viscosities appropriate for different application methods vary considerably.

The coating composition may applied by conventional application methods such as, for example, brushing and spraying methods such as, for example, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in Agreen=or cured form, concrete, gypsum, and stucco. The coating composition applied to the substrate is typically dried, or allowed to dry, at a temperature from 10° C. to 95° C.

In another embodiment of this invention, an adhesive composition containing an aqueous nanocomposite dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the nanocomposites have glass transition temperatures in the range of from −80EC to 80EC. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous nanocomposite dispersion is contemplated. In these embodiments it is preferred that the polymers of the nanocomposites have glass transition temperatures in the range of from −80° C. to 0° C. The caulk or sealant compositions are typically prepared by admixing pigment and such optional adjuvants listed hereinabove as coatings adjuvants as are appropriate. The caulk and sealant compositions are typically prepared at high solids content level such as 70 weight % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous nanocomposite dispersion is contemplated. The ink compositions may include, for example, those known in the art as flexographic inks, gravure inks, ink jet inks, and pigment printing pastes. In these embodiments it is preferred that the polymers of the nanocomposites have glass transition temperatures in the range of from −50° C. to 50° C. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, and silk screens.

In another embodiment of this invention, a nonwoven fabric binder containing an aqueous nanocomposite dispersion is contemplated. The nonwoven binder compositions may include, for example, those known in the art as binders for consumer and industrial nonwovens such as wipes and interlining, binders for insulating nonwovens such as fiberfill and fiberglass, and binders/strengthening agents for nonwovens and paper such as oil filter paper. In these embodiments it is preferred that the polymers of the nanocomposites have glass transition temperatures in the range of from −60° C. to 50° C. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof Application to the substrates is typically effected on machine by saturation bath, roll coater, spray, or the like.

In another embodiment of this invention, a polish containing an aqueous nanocomposite dispersion is contemplated. The polish compositions may include, for example, those known in the art as floor polishes, furniture polishes, and automobile polishes. In these embodiments it is preferred that the polymers of the nanocomposites have glass transition temperatures in the range of from 0° C. to 50° C. The polishes are typically prepared by admixing optional pigment, and the optional adjuvants listed herein above as coatings adjuvants, as appropriate, particularly waxes. The polish compositions are typically applied to substrates including wood, vinyl or polyurethane flooring, ceramic tiles, painted metal, and the like. Application to the substrates is typically effected by spray, roller, mop, or the like.

In another embodiment of this invention, a plastics additive containing an aqueous nanocomposite dispersion is contemplated. The plastics additive compositions may include, for example, those known in the art as processing aids and impact modifiers. In these embodiments it is preferred that the polymers of the nanocomposites have glass transition temperatures in the range of from −50EC to 50EC. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl methacrylate and polypropylene, by milling or extrusion.

In a further aspect of the present invention, a digital imaging composition incorporating an aqueous nanocomposite dispersion and/or nanocomposite particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

In another aspect of the present invention, the emulsion polymer of the nanocomposite may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

In other aspects of the present invention the emulsion polymer of the nanocomposite may be prepared by an emulsion polymerization process which is executed in such a manner to produce a bimodal or mutimodal particle size distribution as is taught in U.S. Pat. No. 4,247,438; U.S. Pat. No. 4,657,966; and U.S. Pat. No. 5,498,655, a bimodal or multimodal molecular weight distribution as is taught in U.S. Pat. No. 4,501,845 and U.S. Pat. No. 5,990,228, or non spherical particles such as, for example, rods as are taught in U.S. Pat. No. 5,369,163 and multilobal particles as are taught in U.S. Pat. No. 4,791,151.

In another aspect of the present invention the emulsion polymer of the nanocomposite may be prepared by a process which produces particles which when dry contain at least one void such as, for example, particles having a single void, multivoided particles, and particles having interpenetrating networks of void and polymer (polymer "sponge").

In another aspect of the present invention the emulsion polymer of the nanocomposite may be prepared by a process which produces particles which may function in a manner instead of or in addition to providing binder functionality. Contemplated are emulsion polymers which function as pigment dispersants or thickeners/rheology modifiers such as alkali-soluble, acid-soluble, and hydrophobically-modified alkali-soluble or acid-soluble emulsion polymers.

EXAMPLES

Examples 1.1 Through 1.4

Suspension Polymerization

The following examples are directed to the preparation of aqueous nanocomposite dispersions by suspension polymerization using the following general procedure.

Example 1.1

Suspension Polymer/Clay Nanocomposite

A first solution, solution #1, is prepared in a beaker using the ingredients and quantities provided in Table I and heated to 60° C. with stirring until the stabilizer, PHARMAGEL®, a gelatine protective colloid manufactured by Sanofi-Synthelabo of Paris, France is fully dissolved. A second solution, solution #2, is prepared in a beaker using the ingredients and quantities provided in Table I and stirred at room temperature in a beaker until the stabilizers, PAD-MAC® (a 15% solution of poly(diallyldimethylammonium chloride in water manufactured by Calgon) and NaCl, are fully dissolved. Then, solution #1 is added to solution #2 while stirring to provide an aqueous solution of suspension agents.

The clay dispersion is prepared using the ingredients and quantities provided in Table I. The dispersion is made by placing methyl methacrylate ("MMA") in a beaker along with CLOISITE® 15A, a hydrophobically modified clay provided by Southern Clay Products, Inc. of Texas, the initiator, lauryl peroxide, and the aqueous phase inhibitor, benzoquinone. This mixture is stirred for 20 minutes at room temperature to allow for complete dissolution of the benzoquinone and lauryl peroxide. Next, the aqueous solution is added to a reactor and stirred with an overhead paddle stirrer for 10 minutes at 245 rpm. The clay dispersion is then added to the aqueous suspension in order to form a monomer dispersion within the reactor. The reactor temperature is then raised to 65° C. over one hour in order to initiate polymerization of the monomer within the clay dispersion. The temperature is allowed to reach 74° C. and then maintained at that temperature by the addition of cold water. Upon completion of the exotherm, the temperature is maintained at 74° C. for 15 minutes. Then, a surfactant, TRITON® CF-32, manufactured by Dow Chemical of Midland, Mich., is added to the reactor, and the temperature is raised to 90° C. for two hours. Finally, the reactor is cooled to room temperature, and the product is collected by filtration.

TABLE I

| Material | Charge Weight (grams) |
|---|---|
| Solution#1 | |
| D.I. water | 67.10 |
| PHARMAGEL ® | 4.75 |
| Solution#2 | |
| D.I. water | 414.00 |
| PADMAC ® | 21.30 |
| NaCl | 93.30 |
| Clay Dispersion | |
| MMA | 333.00 |
| CLOISITE ® 15A (hydrophobically modified clay) | 16.65 |
| Benzoquinone | 0.018 |
| Lauryl Peroxide | 3.30 |
| Post-Reaction Additive | |
| TRITON ® CF-32 | 3 drops |

Comparative Example 1.2

Dispersion Polymer with No Clay

A first solution, solution #1, is prepared in a beaker using the ingredients and quantities provided in Table II and heated to 60° C. with stirring until the PHARMAGEL® is fully dissolved. A second solution, solution #2, is prepared in a beaker using the ingredients and quantities provided in Table II and stirred at room temperature in a beaker until the stabilizers, PADMAC® and NaCl, are fully dissolved. Then, solution #1 is added to solution #2 while stirring to provide an aqueous solution of suspension agents.

The monomer dispersion is prepared using the ingredients and quantities provided in Table II. The dispersion is made by placing methyl methacrylate in a beaker along with the initiators, benzoquinone and lauryl peroxide. This mixture is stirred for 20 minutes at room temperature to allow for complete dissolution of the benzoquinone and lauryl peroxide. Next, the aqueous solution is added to a reactor and stirred with an overhead paddle stirrer for 10 minutes at 245 rpm. The monomer dispersion is then added to the aqueous solution in order to form a monomer dispersion within the reactor. The reactor temperature is then raised to 65° C. over one hour in order to initiate polymerization of the monomer within the clay dispersion. The temperature is allowed to reach 74° C. and then maintained at that temperature by the addition of cold water. Upon completion of the exotherm, the temperature is maintained at 74° C. for 15 minutes. Then, TRITON® CF-32 is added to the reactor, and the temperature is raised to 90° C. for two hours. Finally, the reactor is cooled to room temperature, and the product is collected by filtration.

The product of Comparative Example 1.2 will have reduced toughness, higher flammability, and lower barrier properties than the product of Example 1.1.

TABLE II

| Material | Charge Weight (grams) |
|---|---|
| Solution#1 | |
| D.I. water | 67.10 |
| PHARMAGEL ® | 4.75 |
| Solution#2 | |
| D.I. water | 414.00 |
| PADMAC ® | 21.30 |
| NaCl | 93.30 |
| Monomer Dispersion | |
| MMA | 333.00 |
| Benzoquinone | 0.018 |
| Lauryl Peroxide | 3.30 |
| Post-Reaction Additive | |
| TRITON ® CF-32 | 3 drops |

Example 1.3

Dispersion Polymer and Clay Nanocomposite

Example 1.1 is repeated; however, the MMA monomer is replaced with a mixture of 165 grams of butyl acrylate ("BA"), 165 grams of MMA and 3.0 grams of allyl methacrylate ("ALMA"). The resultant nanocomposite polymer will have a lower Tg than the product of Example 1.1.

Comparative Example 1.4

Dispersion Polymer with No Clay

Example 1.2 is repeated; however, the MMA monomer is replaced with a mixture of 165 grams of BA, 165 grams of MMA and 3.0 grams of ALMA.

Examples 2.1 Through 2.3

Dispersion Polymerization and Direct Swelling of Particles with Hydrophobically Modified Clays to Generate Hollow Polymer/Clay Nanocomposites The following examples are directed to the preparation of hollow polymer and clay nanocomposites by dispersion polymerization and direct swelling of hydrophobically modified clays using the following general procedure.

Preparation of Polymer Seed Dispersion:

A four-necked, round-bottom flask is charged with the ingredients identified in Table III. The mixture is heated at 70° C. for 24 hours under $N_2$ with stirring at a rate of 60 rpm to form polystyrene seed particles with a number average particle diameter of 1.7 μm.

TABLE III

| Chemical: | Charge Weight (grams) |
|---|---|
| Styrene | 140.0 g |
| AIBN | 2.35 g |
| Poly (Acrylic Acid) | 16.8 g |
| Ethanol | 959.0 g |
| DI Water | 280.0 g |

Example 2.1

Hollow Polymer/Clay Nanocomposite Dispersion

A poly(styrene) seed is prepared as detailed above. Next, a 211 mg mass of the polymer seed dispersion containing the poly(styrene) seed is introduced into the reaction vessel along with the following clay dispersion: 300 mg of divinylbenzene, 150 mg of xylene, 30 mg of CLOISITE® 15A (hydrophobically modified clay), 6 mg of benzoyl peroxide, 15 mg of poly(vinyl alcohol), 7 g of ethanol, and 43 g of DI water. The DI water is added to the reaction mixture at a speed of 2.8 ml/h at room temperature with a micro feeder under stirring with a magnetic stirrer. The polymer seeds are swollen within the xylene solvent. Seeded polymerization is initiated in sealed glass tubes under a nitrogen atmosphere of 70° C. for 24 hours thereby providing the hollow polymer clay nanoparticles.

Comparative Example 2.2

Hollow Polymer Dispersion

A poly(styrene) seed is prepared as detailed above. Next, a 211 mg mass of the polymer seed dispersion containing the poly(styrene) seed is introduced into the reaction vessel along with the following: 300 mg of divinylbenzene, 150 mg of xylene, 6 mg of benzoyl peroxide, 15 mg of poly(vinyl alcohol), 7 g of ethanol, and 43 g of DI water. The DI water is added to the reaction mixture at a speed of 2.8 ml/h at room temperature with a micro feeder under stirring with a magnetic stirrer. The polymer seeds are swollen within the xylene solvent. Seeded polymerization is initiated in sealed glass tubes under a nitrogen atmosphere of 70° C. for 24 hours thereby providing the hollow composite particles.

The product of Comparative Example 2.2 will have less collapse resistance, or the voids within the particles will not be as well maintained under adverse conditions, compared with the product of Example 2.1.

Preparation of Polymer Clay Seed Dispersion:

A four-necked, round-bottom flask is charged with the ingredients identified in Table IV. The mixture is heated at 70° C. for 24 hours under $N_2$ with stirring at a rate of 60 rpm to form polystyrene seed particles with a number average particle diameter of 1.7 μm.

TABLE IV

| Chemical: | Charge Weight (grams) |
|---|---|
| Styrene | 40.0 g |
| CLOISITE ® 15A (hydrophobically modified clay) | 2.0 g |
| AIBN | 0.67 g |
| Poly (Acrylic Acid) | 4.80 g |
| Ethanol | 274.0 g |
| DI Water | 80.0 g |

Example 2.3

Hollow Polymer/Clay Nanocomposite Dispersion—Clay in Seed

A poly(styrene) clay seed is prepared as detailed above. Next, a 211 mg mass of the polymer seed dispersion containing the poly(styrene) seed is introduced into the reaction vessel along with the following: 300 mg of divinylbenzene, 150 mg of xylene, 6 mg of benzoyl peroxide, 15 mg of poly(vinyl alcohol), 7 g of ethanol, and 43 g of DI water. The DI water is added to the reaction mixture at a speed of 2.8 ml/h at room temperature with a micro feeder under stirring with a magnetic stirrer. The polymer seeds are swollen within the xylene solvent. Seeded polymerization is initiated in sealed glass tubes under a nitrogen atmosphere of 70° C. for 24 hours thereby providing the hollow polymer clay nanoparticles.

Examples 3.1 Through 3.6

Mini-Emulsion of Polymer/Clay Nanocomposites

The following examples are directed to the preparation of polymer and clay nanocomposites by mini-emulsion polymerization using the following general procedure.

Example 3.1

Mini-emulsion Polymer/Hydrophobically Modified Clay Nanocomposite

A reaction vessel is charged with an aqueous solution comprising sodium lauryl sulfate, sodium bicarbonate, and deionized water in the quantities provided in Table V. A separate vessel is charged with a mixture of styrene, polystyrene, co-surfactant hexadecane, and surfactant OLOA® 370, a polybutene-succinimide pentamine manufactured by Chevron of San Francisco, Calif., in the quantities provided in Table V. To this monomer mixture, a quantity of CLOISITE® 15A is slowly added to the mixture, which is stirred for approximately 20 minutes and then sonified for 30 minutes to provide a clay dispersion. The clay dispersion is gradually added to the aqueous solution within the reaction vessel and is homogenized for a period of 30 minutes to provide a stable mini-emulsion. Then, while the contents of the reaction vessel is being stirred, a quantity of potassium persulfate (see Table V) is added to the reaction vessel. The temperature of the reaction vessel is raised to 75° C. for two hours in order to polymerize the styrene monomer thereby forming the polymer clay nanocomposite colloid. Upon cooling to room temperature, the material is filtered and characterized.

TABLE V

| Chemical: | Amount (g) |
|---|---|
| Styrene | 34.8 |
| Polystyrene | 0.35 |
| CLOISITE ® 15A (hydrophobically modified clay) | 1.05 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |
| OLOA ® 370 | 0.50 |

Comparative Example 3.2

Mini-emulsion Polymer/Clay Nanocomposite

A reaction vessel is charged with an aqueous solution comprising sodium lauryl sulfate, sodium bicarbonate, and deionized water in the quantities provided in Table VI. A separate vessel is charged with a mixture of styrene, polystyrene, co-surfactant hexadecane, and surfactant OLOA® 370 in the quantities provided in quantities provided in Table VI. To this monomer mixture, a quantity of Sodium CLOISITE® is slowly added to the mixture, which is stirred for approximately 20 minutes and then sonified for 30 minutes to provide a clay dispersion. The clay dispersion is gradually added to the aqueous solution within the reaction vessel and is homogenized for a period of 30 minutes to provide a stable mini-emulsion. Then, while the contents of the reaction vessel is being stirred, a quantity of potassium persulfate (see Table VI) is added to the reaction vessel. The temperature of the reaction vessel is raised to 75° C. for two hours in order to polymerize the styrene monomer thereby forming the polymer clay nanocomposite colloid. Upon cooling to room temperature, the material is filtered and characterized.

The use of pristine clay will lead to higher viscosity in the aqueous nanocomposite dispersion and less enhancement in property.

TABLE VI

| Chemical | Amount (g) |
|---|---|
| Styrene | 34.8 |
| Polystyrene | 0.35 |
| Sodium CLOISITE ® ("unmodified clay") | 1.05 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |
| OLOA ® 370 | 0.50 |

Example 3.3

Same as Example 3.1 Except without OLOA 370

A reaction vessel is charged with an aqueous solution comprising sodium lauryl sulfate, sodium bicarbonate, and deionized water in the quantities provided in Table VII. A separate vessel is charged with a mixture of styrene, polystyrene, and hexadecane in the quantities provided in quantities provided in Table VII. To this monomer mixture, a quantity of CLOISITE® 15A is slowly added to the mixture, which is stirred for approximately 20 minutes and then sonified for 30 minutes to provide a clay dispersion. The clay dispersion is gradually added to the aqueous solution within the reaction vessel and is homogenized for a period of 30 minutes to provide a stable mini-emulsion. Then, while the contents of the reaction vessel is being stirred, a quantity of potassium persulfate (see Table VII) is added to the reaction vessel. The temperature of the reaction vessel is raised to 75° C. for two hours in order to polymerize the styrene monomer thereby forming the polymer clay nanocomposite colloid. Upon cooling to room temperature, the material is filtered and characterized.

This example illustrates that the effect of the OLOA surfactant which may help stabilize the polymer within the aqueous nanocomposite dispersions of the present invention.

TABLE VII

| Chemical | Amount (g) |
|---|---|
| Styrene | 34.8 |
| Polystyrene | 0.35 |
| CLOISITE ® 15A (hydrophobically modified clay) | 1.05 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |

Comparative Example 3.4

Mini-emulsion Polymer Latex with No Clay and No OLOA® 370 Surfactant

A reaction vessel is charged with an aqueous solution comprising sodium lauryl sulfate, sodium bicarbonate, and deionized water in the quantities provided in Table VIII. A separate vessel is charged with a mixture of styrene, polystyrene, and hexadecane in the quantities provided in quantities provided in Table VIII. To this monomer mixture, a quantity of CLOISITE® 15A is slowly added to the mixture, which is stirred for approximately 20 minutes and then sonified for 30 minutes to provide a clay dispersion. The clay dispersion is gradually added to the aqueous solution within the reaction vessel and is homogenized for a period of 30 minutes to provide a stable mini-emulsion. Then, while the contents of the reaction vessel is being stirred, a quantity of potassium persulfate (see Table VIII) is added to the reaction vessel. The temperature of the reaction vessel is raised to 75° C. for two hours in order to polymerize the styrene monomer thereby forming the polymer clay nanocomposite colloid. Upon cooling to room temperature, the material is filtered and characterized.

TABLE VIII

| Chemical | Amount (g) |
| --- | --- |
| Styrene | 34.8 |
| Polystyrene | 0.35 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |

Example 3.5

Same as 3.2 but with No OLOA 370

A reaction vessel is charged with an aqueous solution comprising sodium lauryl sulfate, sodium bicarbonate, and deionized water in the quantities provided in Table IX. A separate vessel is charged with a mixture of styrene, polystyrene, and hexadecane in the quantities provided in quantities provided in Table IX. To this monomer mixture, a quantity of Sodium CLOISITE® is slowly added to the mixture, which is stirred for approximately 20 minutes and then sonified for 30 minutes to provide a clay dispersion. The clay dispersion is gradually added to the aqueous solution within the reaction vessel and is homogenized for a period of 30 minutes to provide a stable mini-emulsion. Then, while the contents of the reaction vessel is being stirred, a quantity of potassium persulfate (see Table IX) is added to the reaction vessel. The temperature of the reaction vessel is raised to 75° C. for two hours in order to polymerize the styrene monomer thereby forming the polymer clay nanocomposite colloid. Upon cooling to room temperature, the material is filtered and characterized.

TABLE IX

| Chemical | Amount (g) |
| --- | --- |
| Styrene | 34.8 |
| Polystyrene | 0.35 |
| Sodium CLOISITE ® ("unmodified clay") | 1.05 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |
| OLOA ® 370 | 0.50 |

Example 3.6

Mini-emulsion Polymer/Hydrophobically Modified Clay Nanocomposite

A reaction vessel is charged with an aqueous solution comprising sodium lauryl sulfate, sodium bicarbonate, and deionized water in the quantities provided in Table X. A separate vessel is charged with a mixture of butyl acrylate, methyl methacrylate, co-surfactant hexadecane, and surfactant OLOA® 370, a polybutene-succinimide pentamine manufactured by Chevron of San Francisco, Calif., in the quantities provided in quantities provided in Table X. To this monomer mixture, a quantity of CLOISITE® 15A is slowly added to the mixture, which is stirred for approximately 20 minutes and then sonified for 30 minutes to provide a clay dispersion. The clay dispersion is gradually added to the aqueous solution within the reaction vessel and is homogenized for a period of 30 minutes to provide a stable mini-emulsion. Then, while the contents of the reaction vessel is being stirred, a quantity of potassium persulfate (see Table X) is added to the reaction vessel. The temperature of the reaction vessel is raised to 75° C. for two hours in order to polymerize the monomers thereby forming the polymer clay nanocomposite colloid. Upon cooling to room temperature, the material is filtered and characterized. The material is suited for use as a binder in coating applications. The coatings utilizing this binder will have lower tack, higher apparent hardness, greater thermal stability and less flammability than coatings based on the same binder prepared without clay.

TABLE X

| Chemical: | Amount (g) |
| --- | --- |
| Butyl Acrylate | 20.8 |
| Methyl Methacrylate | 13.9 |
| CLOISITE ® 15A (hydrophobically modified clay) | 1.80 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |
| OLOA ® 370 | 0.50 |

Examples 4.1 Through 4.4

Latex Adsorption

The following examples are directed to the preparation of aqueous nanocomposite dispersions by latex absorption using the following general procedures.

Example 4.1

Latex Adsorption Onto Clay, Followed by Polymerization

A reaction vessel is charged with a quantity of 193 g of a polymer latex with the composition of 46 BA/50.5MMA/3.5MAA (46% polymer solids with a particle size of 100 nm) and a quantity of 216 g of hydrophobically modified clay (CLOISITE® 15A) to form an aqueous suspension. This aqueous suspension comprises discrete composite particles whereby each composite particle has an insoluble clay component and at least one insoluble latex component on the surface of the clay component. The aqueous suspension is heated in a stirred reactor along with an amount of 5300 g of distilled water to a temperature of 85° C. A monomer emulsion is prepared which is comprised of 2409 g BA, 1606 g MMA, and 40 g anionic surfactant with 1000 g of distilled water in a separate vessel. The monomer emulsion is added to the reactor over a 3 hour period along with a second mixture of 10 g of ammonium persulfate dissolved in 500 g of distilled water. At the end of the reaction period, the product is maintained at 85° C. for an additional 2 hours, cooled to room temperature and filtered to yield the desired polymer clay nanocomposite.

Example 4.2

Latex Adsorption Onto Clay, Followed by Polymerization

Example 4.1 is repeated using 2409 g of Styrene and 1006 g of 2-ethylhexyl acrylate ("2-EHA") in place of the BA and MMA in the monomer emulsion of example 4.1.

Example 4.3

Latex Adsorption Onto Clay, Followed by Heating

A reaction vessel is charged with a quantity of 193 g of a polymer latex with the composition of 46 BA/50.5MMA/3.5MAA (46% polymer solids with a particle size of 100 nm) and a quantity of 108 g of hydrophobically modified clay (CLOISITE® 15A) to form an aqueous suspension. This aqueous suspension comprises discrete composite particles whereby each composite particle has an insoluble clay component and at least one insoluble latex component on the surface of the clay component. The suspension is heated to 80° C. for 6 hours to form the desired polymer clay nanocomposite.

The high clay content of this composite makes it ideally suited for use as a concentrate to deliver dispersed clay to other materials such as plastics. In comparison to an unmodified 46BA/50.5MMA/3.5MAA latex, the nanocomposite has a higher modulus, lower solubility in solvent, and forms films with high apparent hardness.

Example 4.4

Latex Adsorption Onto Clay, Followed by Heating

Example 4.3 is repeated with a latex of composition 90 MMA/6.5 BA/3.5 MAA. The heating step is modified to utilize a sealed pressure reactor where the composite is heated to 135° C. for 6 hours. The polymer is heated above its Tg temperature, or 90° C. determined by Fox equation, to allow the polymer clay nanocomposite to form.

The high Tg of this composite makes it ideally suited for isolation by spray drying and blending with plastics to deliver a well dispersed clay that will readily modify the material.

Examples 5.1 Through 5.12

Preparation of Aqueous Polymer Clay Nanocomposites via Preparation of Hydrophobically Modified Clay in the Presence of Latex The following examples are directed to the preparation of aqueous nanocomposite dispersions through the preparation of a hydrophobically modified clay in the presence of latex using the following general procedures.

Example 5.1

Use of Tetra Alkyl Ammonium Halide Compounds as a Surfactant to Modify Clay

A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. To this dispersion is added 1000 g of a polymer latex PRIMAL® SF-16 (manufactured by Rohm and Haas Co. of Philadelphia, Pa.) that has a total solids content of 50.5% to form a latex clay mixture. The latex clay mixture is heated to 60° C. and a mixture of surfactant, comprising 1.71 g 75% active dimethyl di(hydrogenated tallow) ammonium chloride and 0.57 g 77% active dimethyl benzyl (hydrogenated tallow) ammonium chloride that is also heated to 60° C. in a separate flask dispersed in water, is added to the latex clay mixture with vigorous stirring. The temperature is maintained at 60° C. for 2 hours to complete formation of the nanocomposite.

The polymer clay nanocomposite latex will have a higher tensile strength, lower flammability, and higher barrier properties in comparison to an unmodified polymer latex.

Example 5.2

Use of Tetra Alkyl Ammonium Halide Compounds as a Surfactant to Modify Clay and Post Polymerization A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. To this dispersion is added 1000 g of a polymer latex PRIMAL® SF-16 (manufactured by Rohm and Haas Co. of Philadelphia, Pa.) that has a total solids content of 50.5% to form a latex clay mixture. The latex clay mixture is heated to 60° C. and a mixture of surfactant, comprising 1.71 g 75% active dimethyl di(hydrogenated tallow) ammonium chloride and 0.57 g 77% active dimethyl benzyl (hydrogenated tallow) ammonium chloride that is also heated to 60° C. in a separate flask dispersed in water, is added to the latex clay mixture with vigorous stirring. The temperature is maintained at 60° C. for 30 minutes then a monomer mixture comprising 50 g of butyl acyrlate ("BA") and 50 g of methyl methyacrylate ("MMA") is added to provide a reaction mixture. A redox initiator is added to the stirred reaction mixture to polymerize the monomer thereby forming the nanocomposite.

The polymer clay nanocomposite latex will have a higher tensile strength, lower flammability, and higher barrier properties in comparison to an unmodified polymer latex.

Example 5.3 and 5.4

Higher Levels of Hydrophobic Modification

Examples 5.1 and 5.2 are repeated with a mixture of surfactant having 4 g 75% active dimethyl di(hydrogenated tallow) ammonium chloride and 1 g 77% active dimethyl benzyl (hydrogenated tallow) ammonium chloride. The composites of Examples 5.3 and 5.4 will have a higher modulus, as well as enhanced tensile modulus, solvent resistance, and apparent hardness, compared to the composites of Examples 5.1 and 5.2.

The polymer clay nanocomposite latex will have a higher tensile strength, lower flammability, and higher barrier properties in comparison to an unmodified polymer latex.

Example 5.5

Use of Tetra Alkyl Ammonium Acetate as a Surfactant to Modify Clay

A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. To this dispersion is added 1000 g of a polymer latex PRIMAL® SF-16 (manufactured by Rohm and Haas Co. of Philadelphia, Pa.) that has a total solids content of 50.5% to form a latex clay mixture. The latex clay mixture is heated to 60° C. and a quantity of 9.1 g tetra butylammonium acetate dissolved in 200 g of deionized water is added to the latex/clay mixture with vigorous stirring. The temperature is maintained at 60° C. for 2 hours to complete formation of the nanocomposite.

The polymer clay nanocomposite latex will have a higher tensile strength, lower flammability, and higher barrier properties in comparison to an unmodified polymer latex.

Example 5.6

Use of Tetra alkyl ammonium Halide Compounds as a Surfactant and Post Polymerization A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. To this dispersion is added 1000 g of a polymer latex PRIMAL(SF-16 (manufactured by Rohm and Haas Co. of Philadelphia, Pa.) that has a total solids content of 50.5% to form a latex clay mixture. The latex clay mixture is heated to 60° C. and a quantity of 9.1 g tetra butylammonium acetate dissolved in 200 g of deionized water is added to the latex clay mixture with vigorous stirring. The temperature is maintained at 60° C. for 30 minutes, then a monomer mixture comprising 50 g BA and 50 g of MMA is added to provide a reaction mixture. A redox initiator is added to the stirred reaction mixture to polymerize the monomer and the formation of the nanocomposite is complete.

The polymer clay nanocomposite latex will have a higher tensile strength, lower flammability, and higher barrier properties in comparison to an unmodified polymer latex.

Example 5.7

Preparation of an Acid Clay Mixture and Use of Benzyl Trimethyl Ammonium Hydroxide as a Basic Compound A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. A quantity of 2000 g of a strong acid cationic exchange resin, AMBERLITE® IRN-77 (manufactured by Rohm and Haas Co. of Philadelphia, Pa.) is rinsed with 5 liter of deionized water and filtered to provide the cleaned resin. The clean resin is added to the aqueous clay dispersion and stirred for 6 hours at 80° C. The ion exchange resin is removed by filtration to provide an acid clay and water mixture. To this mixture is added 1000 g of a polymer latex, PRIMAL® SF-16 (manufactured by Rohm and Haas Co. of Philadelphia, Pa.), that has a total solids content of 50.5% to form a latex and acid clay mixture. The latex and acid clay mixture is heated to 60° C. and a quantity of 25 g of a 20% aqueous benzyl trimethyl ammonium hydroxide is added with vigorous stirring. The temperature is maintained at 60° C. for 2 hours to complete formation of the nanocomposite.

Example 5.8

Preparation of an Acid Clay Mixture and Use of Benzyl Trimethyl Ammonium Hydroxide as a Basic Compound and Post Polymerization A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. A quantity of 2000 g of a strong acid cationic exchange resin, AMBERLITE® IRN-77 (manufactured by Rohm and Haas Co. of Philadelphia, Pa.) is rinsed with 5 liter of deionized water and filtered to provide the cleaned resin. The clean resin is added to the aqueous clay dispersion and stirred for 6 hours at 80° C. The ion exchange resin is removed by filtration to provide an acid clay and water mixture. To this mixture is added 1000 g of a polymer latex, PRIMAL® SF-16 (manufactured by Rohm and Haas Co. of Philadelphia, Pa.), that has a total solids content of 50.5% to form a latex and acid clay mixture. The latex and acid clay mixture is heated to 60° C. and a quantity of 25 g of a 20% aqueous benzyl trimethyl ammonium hydroxide is added with vigorous stirring. The temperature is maintained at 60° C. for 30 minutes, and then a monomer mixture comprising 50 g BA and 50 g of MMA is added to provide a reaction mixture. A redox initiator is added to the stirred reaction mixture to polymerize the monomer and the formation of the nanocomposite is complete.

Example 5.9

Preparation of an Acid Clay Mixture and Use of Cetyl Trimethyl Ammonium Hydroxide as a Basic Compound A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. A quantity of 2000 g of a strong acid cationic exchange resin, AMBERLITE® IRN-77 (manufactured by Rohm and Haas Co. of Philadelphia, Pa.) is rinsed with 5 liter of deionized water and filtered to provide the cleaned resin. The clean resin is added to the aqueous clay dispersion and stirred for 6 hours at 80° C. The ion exchange resin is removed by filtration to provide an acid clay and water mixture. To this mixture is added 1000 g of a polymer latex, PRIMAL® SF-16 (manufactured by Rohm and Haas Co. of Philadelphia, Pa.), that has a total solids content of 50.5% to form a latex and acid clay mixture. The latex and acid clay mixture is heated to 60° C. and a quantity of 120.4 g of a 7.5% aqueous solution of cetyl trimethyl ammonium hydroxide is added with vigorous stirring. The temperature is maintained at 60° C. for 2 hours to complete formation of the nanocomposite.

Example 5.10

Preparation of an Acid Clay Mixture and Use of Cetyl Trimethyl Ammonium Hydroxide as a Basic Compound and Post Polymerization A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. A quantity of 2000 g of a strong acid cationic exchange resin, AMBERLITE® IRN-77 (manufactured by Rohm and Haas Co. of Philadelphia, Pa.) is rinsed with 5 liter of deionized water and filtered to provide the cleaned resin. The clean resin is added to the aqueous clay dispersion and stirred for 6 hours at 80° C. The ion exchange resin is removed by filtration to provide an acid clay and water mixture. To this mixture is added 1000 g of a polymer latex, PRIMAL® SF-16 (manufactured by Rohm and Haas Co. of Philadelphia, Pa.), that has a total solids content of 50.5% to form a latex and acid clay mixture. The latex and acid clay mixture is heated to 60° C. and a quantity of 120.4 g of a 7.5% aqueous solution of cetyl trimethyl ammonium hydroxide is added with vigorous stirring. The temperature is maintained at 60° C. for 30 minutes, and then a monomer mixture comprising 50 g BA and 50 g of MMA is added to provide a reaction mixture. A redox initiator is added to the stirred reaction mixture to polymerize the monomer and the formation of the nanocomposite is complete.

Example 5.11

Preparation of an Acid Clay Mixture and Use of Cetyl Trimethyl Ammonium Hydroxide as a Basic Compound to Provide a Hydrophobically Modified Clay A reaction flask is charged with a quantity of 25.2 g of Polymer Grade Montmorillonite PGV clay (provided by Nanocor of Arlington Heights, Ill.) and 500 g of deionized water. The aqueous clay dispersion is stirred at 80° C. for 2 hours. A quantity of 2000 g of a strong acid cationic exchange resin, AMBERLITE® IRN-77 (manufactured by Rohm and Haas Co. of Philadelphia, Pa.) is rinsed with 5 liter of deionized water and filtered to provide the cleaned resin. The clean resin is added to the aqueous clay dispersion and stirred for 6 hours at 80° C. The ion exchange resin is removed by filtration to provide an acid clay and water mixture. The acid clay and water mixture is heated to 60° C. and a quantity of 120.4 g of a 7.5% aqueous solution of cetyl trimethyl ammonium hydroxide is added with vigorous stirring. The temperature is maintained at 60° C. for 6 hours. The hydrophobically modified clay is then collected from the mixture by filtration after cooling to room temperature. The clay is then washed with 1 liter of deionized water, dried at 50° C. for 8 hours and ground to provide the desired modified clay.

Example 5.12

Use of a Cationic Latex to form a Nanocomposite with Clay

A reaction vessel is charged with an aqueous solution comprising 1.0 g Ethoquad 18/12 (70%) cationic surfactant, an ethoxylated quarternary ammonium salt (supplied by Akzo Nobel Surface Chemistry of Stratford, Conn.), and 2633 g deionized water. A separate vessel is charged with a mixture of 233 g of deionized water, 19.0 g Ethoquad 18/12 (70%), 56 g METAC (50%) cationic monomer, a methacryloyloxyethyl trimethyl ammonium chloride, 350 g BA, and 350 g MMA which is stirred to form a monomer emulsion. Then, while the contents of the reaction vessel is being stirred, the temperature of the reaction vessel is raised to 85° C. and 40 g of the monomer emulsion prepared above along with a quantity of 7.0 g Wako V-50, a 2,2'-azobis(2-amidinopropane)dihydrochloride initiator (supplied by Dock Resins Co. of Linden, N.J.), dissolved in 45 g deionized water is added to the reaction vessel. After 5 minutes, the remaining monomer emulsion is added to the reaction vessel over 2 hours along with a separate solution of Wako V-50 dissolved on 150 g of deionized water. When the addition is complete, the reaction is held at 85° C. for 2 hours and then cooled to 60° C. A mixture of 36 g of Polymer Grade Montmorillonite PGV clay (provided by Nanocor of Arlington Heights, Ill.) in 400 g of deionized water that is stirred at 60° C. for 2 hours is added to the reaction vessel. The temperature is maintained at 60° C. for 2 hours to complete the formation of the nanocomposite.

We claim:

1. A method for preparing a polymer clay nancomposite dispersion, wherein the method comprises:

polymerizing via suspension polymerization an aqueous suspension comprising at least one ethylenically unsaturated monomer, one or more stabilizer, and a hydrophobically modified clay to form an aqueous nanocomposite dispersion after polymerization, wherein the hydrophobically modified clay is dispersed in the monomer phase of the said suspension.

2. The method of claim 1 wherein said suspension polymerization comprises:

providing at least one stabilizer wherein the stabilizer is dispersable or soluble within an aqueous liquid medium;

providing a clay dispersion comprising a hydrophobically modified clay and at least one ethylenically unsaturated monomer;

adding the clay dispersion to the at least one stabilizer; and polymerizing the monomer to form an aqueous nanocomposite dispersion.

3. The method of claim 1 wherein the monomer is selected from the group consisting of $C_1$–$C_{18}$ alkyl methacrylate, $C_1$–$C_{18}$ alkyl acrylate, 2-ethylhexyl (meth)acrylate, isobornyl (meth)acrylate, lauryl (meth)acrylate, allyl (meth)acrylate, stearyl (meth)acrylate, acrylic acid, itaconic acid, methacrylic acid, butadiene, vinyl acetate, vinyl versatate, styrene, vinyl aromatic monomers, divinylbenzene, divinylpyridine, divinyltoluene, diallyl phthalate, ethylene glycol diacrylate, ethylene glycol dimethacrylate, divinyixylene, divinylethylbenzene, divinylsulfone, divinylketone, divinylsulfide, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N -methylene dimethacrylamide, N,N -methylene dimethacrylamide, N,N -ethylenediacrylamide, trivinylbenzene, and the polyvinyl ethers of glycol, glycerol, pentaerythritol, resorcinol, monothio and dithio derivatives of glycols, and combinations thereof.

4. The methods of claim 1 wherein the clay has a concentration in the range of from 0.1 to 10 weight percent, based on the weight of the monomer within the nanocomposite.

5. The method of claim 1 wherein the clay is selected from the group consisting of smectite, phyllosilicate, montmorillonite, saponite, beidellite, montronite, hectorite, stevensite, vermiculite, kaolinite, hallosite, synthetic phyllosilicates, and combinations thereof.

6. The method of claim 1 wherein the clay is at least partially exfoliated in the nanocomposite.

7. The method of claim 1 wherein the clay is hydrophobically modified by a surfactant or a silane.

8. The method of claim 7 wherein the surfactant comprises a cationic surfactant.

9. The method of claim 8 wherein the cationic surfactant comprises at least one alkyl group of $C_{10}$ or higher.

10. The method of claim 1 wherein the clay is hydrophobically modified by the method comprising the steps of:

providing an aqueous dispersion comprising a clay and at least one ion exchange resin to provide an acid clay and water mixture;

introducing at least one basic compound to the acid clay and water mixture to form a reaction mixture; and heating the reaction mixture to a temperature and for a time to provide a hydrophobically modified clay.

11. The method of claim 1 wherein the polymer is at least partially intercalated within the nanocomposite.

12. The method of claim 1 wherein the particle size of the nanocomposite particles is from 1 μm to 10000 μm.

* * * * *